United States Patent
Yamaguchi et al.

(10) Patent No.: US 9,977,400 B2
(45) Date of Patent: May 22, 2018

(54) EXHAUST AIR CLEANING APPARATUS AND IMAGE FORMING APPARATUS

(71) Applicant: Konica Minolta, Inc., Chiyoda-ku (JP)

(72) Inventors: Masahiro Yamaguchi, Toyokawa (JP); Shigeru Tashiro, Toyokawa (JP); Kuniya Matsuura, Toyohashi (JP); Hiroshi Mizuno, Aisai (JP); Masayuki Satou, Toyohashi (JP); Shoichi Yoshikawa, Okazaki (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 161 days.

(21) Appl. No.: 14/568,861

(22) Filed: Dec. 12, 2014

(65) Prior Publication Data

US 2015/0168913 A1  Jun. 18, 2015

(30) Foreign Application Priority Data

Dec. 13, 2013  (JP) .................................. 2013-258470

(51) Int. Cl.
*G03G 21/00* (2006.01)
*G03G 21/20* (2006.01)
(Continued)

(52) U.S. Cl.
CPC ....... *G03G 21/206* (2013.01); *B01D 46/0041* (2013.01); *B01D 46/446* (2013.01)

(58) Field of Classification Search
CPC ......... G03G 21/206; G03G 2221/1645; B01D 37/046; B01D 46/446; B01D 46/0041;
(Continued)

(56) References Cited

U.S. PATENT DOCUMENTS 5,021,831 A * 6/1991 Tonomoto ........................ 399/93
5,819,137 A * 10/1998 Hoffman et al. ................ 399/93
5,899,600 A * 5/1999 Hockey et al. .................. 399/93

FOREIGN PATENT DOCUMENTS

JP 0736324 A 2/1995
JP 10-161491 A 6/1998
(Continued)

OTHER PUBLICATIONS

Japanese Office Action with English Translation, corresponding to Japanese Patent Application No. 2013-258470, dated Nov. 17, 2015; 7 pages.

*Primary Examiner* — Robert Beatty
(74) *Attorney, Agent, or Firm* — Buchanan Ingersoll & Rooney PC

(57) ABSTRACT

An exhaust air cleaning apparatus includes a cleaning duct for cleaning air to be exhausted from an exhaust port of an image forming apparatus. In the cleaning duct, a fan and a filter are provide between an inflow part connected with the exhaust port of the image forming apparatus and a discharge port for discharging air from the inside of the cleaning duct. The exhaust air cleaning apparatus further includes a pressure adjusting part for adjusting the pressure in the cleaning duct. The pressure adjusting part performs pressure adjustment so that the pressure at a pressure adjusting position located between the inflow part and the fan in the cleaning duct falls within an appropriate pressure range determined in advance to be equal to or less than atmospheric pressure.

20 Claims, 12 Drawing Sheets

(51) Int. Cl.
*B01D 46/44* (2006.01)
*B01D 46/00* (2006.01)

(58) Field of Classification Search
CPC ............ B01D 46/0023; B01D 2273/28; B01D 2273/30; B01D 2273/45
USPC ..................................................... 399/92, 93
See application file for complete search history.

(56) References Cited

FOREIGN PATENT DOCUMENTS

| | | | |
|---|---|---|---|
| JP | 11153894 A | | 6/1999 |
| JP | 2004-354663 A | | 12/2004 |
| JP | 2007003890 A | * | 1/2007 |
| JP | 2007065404 A | * | 3/2007 |
| JP | 2007316189 A | * | 12/2007 |
| JP | 2012240837 A | * | 12/2012 |

* cited by examiner

EXHAUST AIR CLEANING APPARATUS AND IMAGE FORMING APPARATUS

CROSS-REFERENCE TO RELATED APPLICATIONS

This application is based upon and claims the benefit of priority from the prior Japanese Patent Application No. 2013-258470 filed on Dec. 13, 2013, the entire contents of which are incorporated herein by reference.

BACKGROUND OF THE INVENTION

1. Field of the Invention

The present invention relates to an exhaust air cleaning apparatus for cleaning or purifying exhaust air containing by-products generated in an image forming apparatus during image formation, and, the image forming apparatus for appropriately cleaning exhaust air containing by-products generated during image formation.

2. Description of Related Art

It is conventionally known that image forming apparatuses such as a copier, a printer, a facsimile machine, or a combined machine including multiple functions thereof, generate various by-products during image formation. The by-products are for example odor, VOC (Volatile Organic Compounds), low-molecular siloxane, and powder dust (toner, paper dust, etc.). In general, an image forming apparatus is configured to suck by-products from the site of generation thereof and collect the sucked by-products with a filter based on a fixed standard to prevent discharge of the by-products out of the apparatus.

Such an image forming apparatus configured to collect the by-products is for example disclosed in Japanese patent application publication No. 10-161491 (1998). This publication discloses an image forming apparatus provided, on its rear side, with an exhaust fan for exhausting air from the apparatus and an external exhaust duct including a filter to collect by-products. The external exhaust duct is provided protruding from the rear side of a main unit of the apparatus. The apparatus is further provided, in a place of the rear side other than the external exhaust duct, with an exhaust port for discharging the air containing no by-products in order to cool the inside of the main unit. Even if the thus configured image forming apparatus is installed in a place so that the rear side closely contacts with a wall of the installation place, the cooling exhaust port is not closed by the wall because of the external exhaust duct is provided on the rear side. This enables smooth exhaust of the cooling air. Since the external exhaust duct is detachably attached to the rear side of the main unit, the apparatus with the exhaust duct detached can be carried in a room whose doorway is narrow and others. This provides improved distribution easiness.

Further, Japanese patent application publication No. 2004-354663 discloses an image forming apparatus provided with a plurality of exhaust ducts each including an exhaust fan and a suction filter and being configured to individually such by-products from the site of generation thereof, and a communication duct in which exhaust air streams from the exhaust ducts enter together. In the communication duct, there are provided an ozone filter and an air pressure meter for measuring air pressure at an upstream position from the ozone filter. Based on measured values by the air pressure meter, the exhaust fans in the exhaust ducts upstream of the communication duct are controlled to adjust the air pressure in the communication duct to fall below a predetermined value. This enables suppressing deterioration of exhaust efficiency without applying excessive load to the exhaust fans.

Meanwhile, some users of the image forming apparatuses demand for further cleaning or purifying of even exhaust air that satisfies standards by passing through the filter. Therefore, it is conceivable to attach an exhaust air cleaning apparatus such as the external exhaust duct of the publication No. 2004-354663 including the cleaning filter for further cleaning exhaust air to the exhaust port of the image forming apparatus already installed. However, when the exhaust air cleaning apparatus is connected to the exhaust port, it is necessary to appropriately control the pressure at a position upstream of the cleaning filter in the exhaust air cleaning apparatus. When the pressure at the above position is too high, the exhaust air from the exhaust port of the image forming apparatus is not allowed to appropriately pass through the cleaning filter of the exhaust air cleaning apparatus. Thus, the inside of the image forming apparatus could not be appropriately cooled, which may cause excessive temperature increase in the image forming apparatus. This is because the exhaust air that could not pass through the cleaning filter of the exhaust air cleaning apparatus is likely to leak through a connection part or connection part between the exhaust port of the image forming apparatus and the exhaust air cleaning apparatus and others.

It is therefore conceivable, as disclosed in the publication No. 2004-354663, to provide the air pressure meter on an upstream side of the cleaning filter in the exhaust air cleaning apparatus to continuously keep the pressure at the position of the air pressure meter to be the predetermined value or less. However, when the pressure on the upstream side of the cleaning filter in the exhaust air cleaning apparatus is too low, the inside of the image forming apparatus may be excessively cooled. Specifically, for example, there is a problem that the fixing unit for fixing a toner image by heat is excessively cooled, resulting in toner fixing failures.

The above problems also occur in an image forming apparatus including two or more fans arranged in series on an exhaust path for exhausting air from the apparatus. Specifically, when the pressure between the fans placed in series on the exhaust path is not appropriate, resulting in inappropriate exhaust, the following disadvantages are caused. The internal temperature of the apparatus may excessively rise. The exhaust air before passing through the cleaning filter may leak out of the apparatus. In addition, the fixing unit may be excessively cooled.

The present invention has been made to solve the above problems of the aforementioned conventional arts and has a purpose to provide an exhaust air cleaning apparatus and an image forming apparatus capable of suppressing adverse influences on devices or units for image formation and quality deterioration of an image to be formed and also appropriately collecting by-products generated during image formation.

SUMMARY OF THE INVENTION

To achieve the above purpose, one aspect of the invention provides an exhaust air cleaning apparatus including a cleaning duct for cleaning air to be exhausted from an image forming apparatus through an exhaust port of the image forming apparatus, the exhaust air cleaning apparatus including: an inflow part communicated with inside of the cleaning duct and connected with the exhaust port of the image forming apparatus; an discharge port through which air in the cleaning duct is to be discharged out of the cleaning duct; a fan for allowing air to flow from the inflow part toward the discharge port and a filter for collecting fine particles in the air, the fan and filter being provided between the inflow part and the discharge port in the cleaning duct; and a pressure adjusting part configured to perform adjustment of pressure in the cleaning duct, the pressure adjusting part being configured to adjust the pressure in the cleaning duct so that pressure at a pressure adjusting position located between the inflow part and the fan in the cleaning duct falls within an appropriate pressure range determined in advance to be equal to or less than atmospheric pressure.

In the exhaust air cleaning apparatus configured as above, the pressure at the pressure adjusting position between the inflow part and the fan in the cleaning duct is continuously maintained within the appropriate pressure range equal to or lower than the atmospheric pressure. Accordingly, the exhaust air discharged through the exhaust port of the image forming apparatus is caused to pass through the filter in the cleaning duct and flow out of the cleaning duct without interfering air exhaust of the image forming apparatus attached with the exhaust air cleaning apparatus. This enables appropriate collecting of by-produces when they are contained in the air to be exhausted from the image forming apparatus. Specifically, it is possible to clean or purify exhaust air of the image forming apparatus while suppressing adverse influences on devices for image formation in the image forming apparatus and quality deterioration of an image to be formed.

DESCRIPTION OF EMBODIMENTS

First Embodiment

Figure 1:
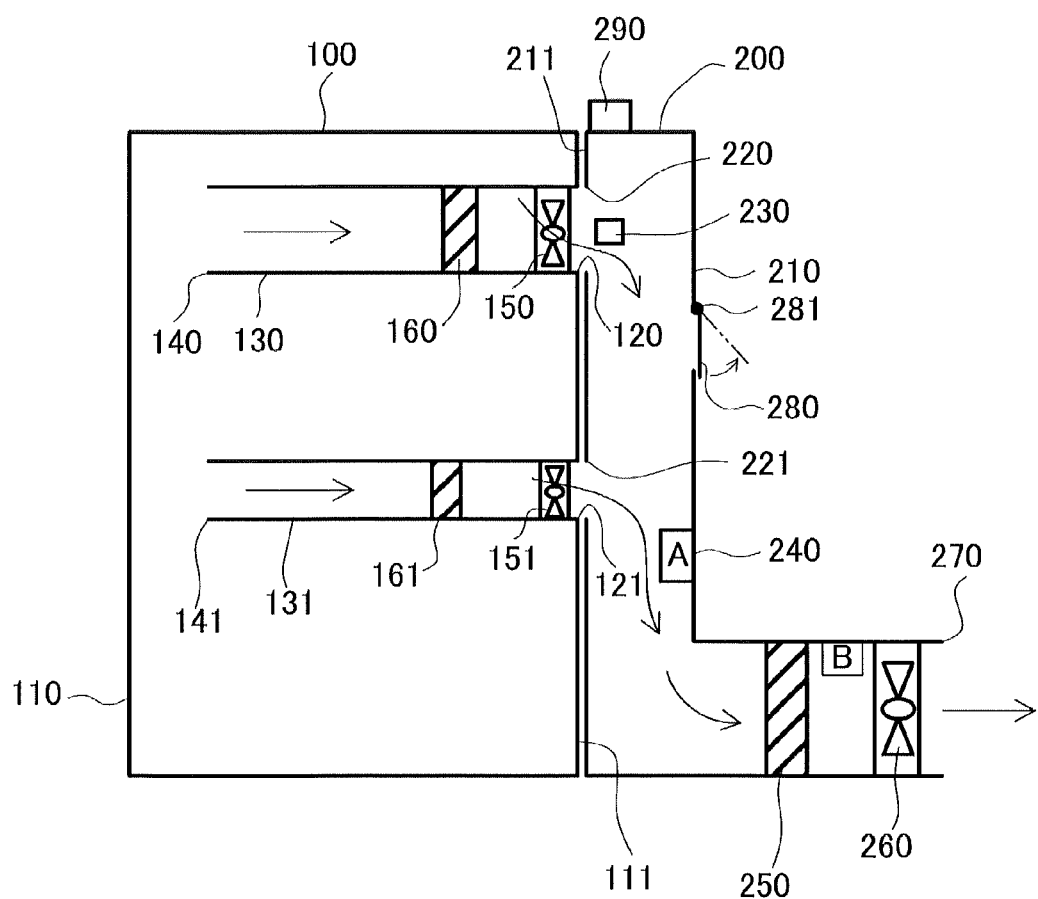
FIG. 1 is a schematic configuration view of an exhaust air cleaning apparatus used in an image forming apparatus in a first embodiment.

A detailed description of a first embodiment of the present invention will now be given referring to the accompanying drawings. This embodiment shows, as schematically illustrated in FIG. 1, an exhaust air cleaning apparatus 200 used in an image forming apparatus 100 and connected to an exhaust port of the image forming apparatus 100. The image forming apparatus 100 is configured to fix a toner image on a sheet by an electrophotographic method to form an image.

In the image forming apparatus 100 shown in FIG. 1, the left side corresponds to a front surface 110 of the apparatus and the right side corresponds to a rear surface 111 of the same. On the front surface 110, therefore, an operation panel and others are provided to allow a user to operate the image forming apparatus 100. Further, this apparatus 100 includes a plurality of exhaust ports (outlets) 120 and 121 in the rear surface 111 as shown in FIG. 1.

The exhaust ports 120 and 121 are both openings for exhausting air from inside to outside of the image forming apparatus 100. On the inner side of each of the exhaust ports 120 and 121, an internal duct 130 or 131 is provided. The internal ducts 130 and 131 are respectively provided, at opposite ends of the exhaust ports 120 and 121, with suction ports (inlets) 140 and 141 opening in the apparatus. The suction ports 140 and 141 are both open near a developer for forming a toner image or a fixing unit for fixing the formed toner image onto a sheet.

In the internal ducts 130 and 131, there are respectively provided internal fans 150 and 151 and internal filters 160 and 161. The fans 150 and 151 are both used to exhaust the air in the ducts 130 and 131 to the outside of the apparatus 100. The filters 160 and 161 are used to collect or trap by-products contained in the air passing through the internal filters 160 and 161 according to fixed standards. The by-products are for example the toner not appropriately fixed to the sheet, low-molecular siloxane generated from the toner melted during a fixing process, and others, which are generated in the image forming apparatus 10.

When the internal fans 150 and 151 are driven, the air near the suction ports 140 and 141 are sucked into the internal ducts 130 and 131. At that time, the by-products present near the suction ports 140 and 141 are also sucked together with the air into the ducts 130 and 131. The air in the ducts 130 and 131 is caused to pass through the internal filters 160 and 161 respectively to remove the by-products and then is exhausted out of the image forming apparatus 100 through the exhaust ports 120 and 121. In this way, the air to be discharged through the exhaust ports 120 and 121 has already been rendered harmless in conformity to a fixed standard.

However, some users of the image forming apparatus 100 demand for further cleaning of even the exhaust air made harmless in conformity to the fixed standard as above. Specifically, the air to be exhausted through the exhaust ports 120 and 121 may contain by-products uncollectible by the internal filters 160 and 161. The by-products to be discharged through the exhaust ports 120 and 121 are for example by-products having smaller particle diameters than a minimum one of the particle diameters of by-products collectable by the internal filters 160 and 161. The exhaust air cleaning apparatus 200 shown in FIG. 1 is configured to collect the by-products that could not be collected by the internal filters 160 and 161.

The exhaust air cleaning apparatus 200 includes a cleaning duct 210 having an attachment surface 211 with which the exhaust air cleaning apparatus 200 is attached to the rear surface 111 of the image forming apparatus 100. To be concrete, the attachment surface 211 of the exhaust air cleaning apparatus 200 is fixedly bonded to the rear surface 111 of the image forming apparatus 100 with an adhesive tape.

The attachment surface 211 of the exhaust air cleaning apparatus 200 is formed with inflow parts 220 and 221 each continuous with the inside of the cleaning duct 210. The inflow parts 220 and 221 are located in positions in the exhaust air cleaning apparatus 200 corresponding to the positions of the exhaust ports 120 and 121 of the image forming apparatus 100 as shown in FIG. 1. Thus, the air exhausted through the exhaust ports 120 and 121 of the image forming apparatus 100 attached to the exhaust air cleaning apparatus 200 will be discharged into the cleaning duct 210. Further, the exhaust air cleaning apparatus 200 includes, inside the cleaning duct 210, an air-flow measuring section 230, a pressure detecting section 240, a cleaning filter 250, and an exhaust fan 260.

The airflow measuring section 230 is an air-flow sensor for measuring a flow rate of air at that position. The air-flow measuring section 230 is placed near an inflow part 220 in the cleaning duct 210 as shown in FIG. 1. Accordingly, the air-flow measuring section 230 can measure the exhaust air-flow rate when air is exhausted from the image forming apparatus through the exhaust port 120. The pressure detecting section 240 is a pressure sensor for detecting the pressure at that position. In the present embodiment, the pressure detecting section 240 is configured to detect gauge pressure indicative of a difference between absolute pressure and atmospheric pressure.

The cleaning filter 250 is a filter with higher performance than the internal filters 160 and 161 of the image forming apparatus 100 and can collect even by-products uncollectable by the internal filters 160 and 161. To be concrete, the cleaning filter 250 can collect even by-products having smaller particle diameters than the minimum particle diameter of the by-products (fine particles) collectable by the internal filters 160 and 161.

The exhaust fan 260 is configured to discharge the air flowing through the cleaning duct 210 to the outside of the exhaust air cleaning apparatus 200 through a discharge port 270 of the apparatus 200. The exhaust fan 260 has such specifications as to discharge a larger flow rate of air from the apparatus 200 through the discharge port 270 than the sum of flow rates of air exhausted from the image forming apparatus 100 through the exhaust ports 120 and 121. Further, the exhaust fan 260 is arranged to increase its discharge air-flow rate as the drive voltage driving the fan 260 is increased, thereby increasing the flow rate of air to be discharged through the discharge port 270.

Furthermore, an opening and closing part (an openable part) 280 is provided on a wall surface of the cleaning duct 210 on the right side in FIG. 1. The opening and closing part 280 is a door rotatable about a pivot point 281. The cleaning duct 210 is formed with an opening in a place corresponding to the opening and closing part 280. The opening and closing part 280 illustrated with a solid line in FIG. 1 is placed in a closed position and is movable to an open position as illustrated with a double dashed line. Thus, when the opening and closing part 280 is placed in the closed position, the opening of the cleaning duct 210 in correspondence with the opening and closing part 280 is closed. When the opening and closing part 280 is placed in the open position, on the other hand, the inside of the cleaning duct 210 is communicated with the outside. In a normal state, the opening and closing part 280 is in the closed position.

As shown in FIG. 1, the exhaust air cleaning apparatus 200 includes a controller 290 for controlling the voltage of driving the exhaust fan 260, as mentioned in detail later, based on a measured value of the air-flow measuring section 230 and a detected value of the pressure detecting section 240. Thus, the air-flow measuring section 230 can output a measured value of the measured air flow rate to the controller 290. The pressure detecting section 240 can output a detected value of the detected pressure to the controller 290. The controller 290 also controls the opening and closing part 280 to open and close.

The pressure detecting section 240, the cleaning filter 250, and the exhaust fan 260 are each arranged in a position between the inflow part 221, which is located on the more downstream side between the inflow parts 220 and 221 in the exhaust path in the cleaning duct 210, and the discharge port 270. Further, the pressure detecting section 240 is placed in a pressure adjusting position between the inflow part 221 and the exhaust fan 260. In the present embodiment, additionally, the cleaning filter 250 is placed between the pressure detecting section 240 and the exhaust fan 260.

In the exhaust air cleaning apparatus 200 configured as above, when the exhaust fan 260 is driven, the air in the cleaning duct 210 is caused to pass through the cleaning filter 250 and be discharged out through the discharge port 270. Accordingly, in the exhaust air cleaning apparatus 200, the cleaning filter 250 collects the by-products having been uncollected by the internal filters 160 and 161 and thus the air discharged from the image forming apparatus 100 is exhausted out after further cleaned or purified.

In the exhaust air cleaning apparatus 200 in the present embodiment, furthermore, the exhaust fan 260 is driven only while the image forming apparatus 100 is in operation. This is because it is not preferable to continuously hold the exhaust fan 260 in a driven state from the view point of power saving, noise, service life of the exhaust fan 260. To be concrete, the controller 290 of the exhaust air cleaning apparatus 200 can judge whether or not the image forming apparatus 100 is in operation, based on a measured value of the flow rate of air exhausted through the exhaust port 120 of the image forming apparatus 100 and measured by the air-flow measuring section 230. Specifically, when the measured value of the air-flow measuring section 230 is equal to or more than an air-flow rate threshold determined in advance for the air-flow, the controller 290 judges that the image forming apparatus 100 is in operation. On the other hand, when the measured value of the air-flow measuring section 230 is less than the air-flow rate threshold, the image forming apparatus 100 is judged to be not in operation, i.e. to be in the stopped state.

In the exhaust air cleaning apparatus 200, the drive voltage of the exhaust fan 260 is controlled to adjust the pressure in the cleaning duct 210 to always fall within an appropriate range while the image forming apparatus 100 is operating. When the pressure in the cleaning duct 210 is too high, it may adversely affect the devices or units in the main unit of the image forming apparatus 100 and images to be formed by the image forming apparatus 100. When the pressure on the upstream side of the exhaust fan 260 in the cleaning duct 210 is too high and hence the air is not appropriately exhausted from the image forming apparatus 100, for example, the amount of heat going out of the image forming apparatus 100 decreases, thereby making it impossible to appropriately keep the internal temperature of the apparatus 100.

Furthermore, the air may leak out before it is cleaned by the exhaust air cleaning apparatus 200. Specifically, the high pressure in the cleaning duct 210 does not allow part of the air exhausted through the exhaust ports 120 and 121 of the image forming apparatus 100 to enter the cleaning duct 210, thus causing leak of the air for example through connection parts of the exhaust ports 210 and 121 with the inflow parts 220 and 221. In this case, the exhaust air cleaning apparatus 200 could not sufficiently provide the advantages obtainable by attachment to the image forming apparatus 100. It is to be noted that the leaked air has been already made harmless by passing through the internal filters 160 and 161 in the image forming apparatus 100.

On the other hand, when the pressure on the upstream side of the exhaust fan 260 in the cleaning duct 210 is too low, the suction force at the suction ports 140 and 141 of the ducts 130 and 131 in the image forming apparatus 100 may be made too large. This may cause toner scattering near the suction ports 140 and 141. Also, the internal temperature of the image forming apparatus 100 is excessively decreased, for example, the fixing unit in the apparatus 100 may be excessively cooled and thus could not appropriately fix a toner image, resulting in deteriorated image quality.

Therefore, the controller 290 of the exhaust air cleaning apparatus 200 controls the drive voltage of the exhaust fan 260 so that the pressure detected by the pressure detecting section 240 on the upstream side of the exhaust fan 260 in the cleaning duct 210 is continuously a pressure falling within the appropriate pressure range that does not cause the aforementioned disadvantages. The inventors experimentally found that it is preferable that the pressure on the upstream side of the exhaust fan 260 in the cleaning duct 210 falls within a range of 0 Pa or less and −30 Pa or more (within the appropriate pressure range) in gauge pressure.

Concretely, when the gauge pressure in the cleaning duct 210 exceeds 0 Pa, some air may leak out from part of the exhaust path before the air is cleaned by the exhaust air cleaning apparatus 200. On the other hand, when the gauge pressure in the cleaning duct 210 is less than −30 Pa, a non-contact thermistor arranged to detect the temperature of the fixing unit could not detect a precise temperature of the fixing unit in some cases. Accordingly, when the temperature of the fixing unit in the image forming apparatus 100 is not appropriately managed, fixing failures of toner to a sheet may occur. In the exhaust air cleaning apparatus 200 in the present embodiment, consequently, the drive voltage of the exhaust fan 260 is controlled to bring the gauge pressure in the cleaning duct 210 detected by the pressure detecting section 240 into the range of 0 Pa to −30 Pa inclusive.

Next, the operations of the exhaust air cleaning apparatus 200 will be explained referring to a flowchart in FIG. 2. When the power of the exhaust air cleaning apparatus 200 is turned on, the air-flow measuring section 230 measures the flow rate of air exhausted from the image forming apparatus 100 through the exhaust port 120 and outputs a measured value thereof to the controller 290 (S101). At that time, the exhaust fan 260 is in a stop state and the opening and closing part 280 is in the closed position.

Based on the air-flow-rate measured value transmitted from the air-flow measuring section 230, the controller 290 judges whether or not the image forming apparatus 100 is in operation (S102). To be concrete, as mentioned above, when the air-flow rate measured value is equal to or higher than the air-flow rate threshold determined in advance for air flow rate, the image forming apparatus 100 is judged to be in operation (S102: YES).

On the other hand, when the air-flow rate measured value is less than the air-flow rate threshold, the image forming apparatus 100 is judged to be not in operation (S102: NO), it is then judged whether or not the exhaust fan 260 is being stopped (S103). After power-on of the exhaust air cleaning apparatus 200 and before start of operation of the image forming apparatus 100, the exhaust fan 260 is being stopped (S103: YES), the processing returns to step S101 in which the air-flow measurement is performed again. The controller 290 repeats steps S101 to S103 until the image forming apparatus 100 starts to operate.

When the image forming apparatus 100 starts to operate (S102: YES), the exhaust fan 260 being stopped (S104: NO) starts to be driven (S105). Successively, the pressure detecting section 240 detects the gauge pressure and outputs a detected value thereof to the controller 290 (S106). The controller 290 judges whether or not the gauge pressure transmitted from the pressure detecting section 240 is 0 Pa or less (S107).

The gauge pressure detected by the pressure detecting section 240 is usually 0 Pa or less. The reason is because the exhaust fan 260 can discharge a larger flow rate of air through the discharge port 270 than the sum of flow rates of the air exhausted through the exhaust ports 120 and 121 of the image forming apparatus 100. Immediately after the exhaust fan 260 starts to be driven, the number of rotations of the exhaust fan 260 is not stable. Thus, the pressure detecting section 240 preferably starts to detect the gauge pressure after the exhaust fan 260 starts to be driven and the number of rotations thereof becomes stable.

Subsequently, when the gauge pressure is 0 Pa or less (S107: YES), it is judged whether or not the gauge pressure is less than a set pressure value (S108). The set pressure value is a value determined in advance in a range of pressure that does not cause any problems such as leakage of exhaust air before cleaning and adverse influences on the image forming apparatus 100. Concretely, the set pressure value in the present embodiment is determined to the range of 0 Pa or less and −30 Pa or more (within the appropriate pressure range) in gauge pressure.

When the gauge pressure is less than the set pressure value (S108: YES), the drive voltage of the exhaust fan 260 is decreased by a predetermined value (S109). On the other hand, when the gauge pressure is equal to or more than the set pressure value (S108: NO) and the drive voltage of the exhaust fan 260 is allowed to increase more than a current state (S110: YES), the drive voltage of the exhaust fan 260 is increased by a predetermined value (S111). After the drive voltage of the exhaust fan 260 is controlled (S109, S111), the processing returns to step S101.

Specifically, while the image forming apparatus 100 continues to operate (S102: YES), the drive voltage of the exhaust fan 260 being driven (S104: YES) is decreased or increased (S109, S111) based on the gauge pressure (S107, S108, S110). Accordingly, it is possible to clean the exhaust air from the image forming apparatus 100 with the cleaning filter 250 while maintaining the gauge pressure in the cleaning duct 210 at about the set pressure value. For this period, exhaust air leakage before cleaning and adverse influences on the image forming apparatus 100 do not occur.

When the image forming apparatus 100 is judged to be stopped operating during driving of the exhaust fan 260 (S102: NO), the controller 290 stops driving of the exhaust fan 260 being driving (S103: NO) (S112) in view of power saving, noise, the service life of the exhaust fan 260, and others.

When the gauge pressure detected by the pressure detecting section 240 exceeds 0 Pa (S107: NO) even through the exhaust fan 260 is being driven, the opening and closing part 280 is turned to the open position (S113). When the opening and closing part 280 is opened, the pressure in the cleaning duct 210 can be maintained at the pressure equal to atmospheric pressure. If the pressure in the cleaning duct 210 exceeds the atmospheric pressure, it may interfere with exhaust of air from the image forming apparatus 100, which may result in decreased quality of images to be formed by the image forming apparatus 100 and further breakdown of the image forming apparatus 100. With the opening and closing part 280 held in the open position, the exhaust air before passing through the cleaning filter 250 flows out though the opening and closing part 280. This outflowing air has been already made harmless by the internal filters 160 and 161.

When the gauge pressure detected by the pressure detecting section 240 is equal to or more than the set pressure value (S108: NO) even during driving of the exhaust fan 260 and also the drive voltage is not allowed to increase more than a current state (S110: NO), the opening and closing part 280 is also operated to the open position (S113). This reason is because, in this case, the pressure in the cleaning duct 210 is still equal to or less than atmospheric pressure; however, the drive voltage of the exhaust fan 260 reaches an upper limit and thus it is difficult to maintain the pressure in the cleaning duct 210 at a value equal to or less than atmospheric pressure. In the exhaust air cleaning apparatus 200, therefore, the pressure in the cleaning duct 210 is adjusted to fall within the range of 0 Pa to −30 Pa inclusive (within the appropriate pressure range).

When clogging of the cleaning filter 250 is considered as a cause of making the processing advance to the step S113, the opening and closing part 280 of the exhaust air cleaning apparatus 200 is placed in the open position and simultaneously the information indicating that the time for replacement of the cleaning filter 250 has come may be given to a user. Alternatively, if it is conceived as the cause that the discharge air-flow rate of the exhaust fan 260 decreases due to breakdown or service life, this cause may be informed to a user. In step S113, it is also conceived to place the opening and closing part 280 in the open position and simultaneously stop driving of the exhaust fan 260.

Furthermore, the opening and closing part 280 is not limited to open and close under control of the controller 290 and may be configured to be in the closed position in a normal state where the pressure in the cleaning duct 210 is equal to or less than atmospheric pressure and operated to the open position by the pressure in the cleaning duct 210 when the pressure in the cleaning duct 210 exceeds the atmospheric pressure. The air-flow measuring section 230 may also be configured to measure an air flow rate of exhaust air through the exhaust port 121 of the image forming apparatus 100. Specifically, the air-flow measuring section 230 may be placed in the cleaning duct 210 near the inflow part 221. As an alternative, the air-flow measuring sections 230 may be provided one each near the inflow parts 220 and 221 in the cleaning duct 210 to measure both air flow rates of exhaust air exhausted through the exhaust ports 120 and 121.

Figure 2:
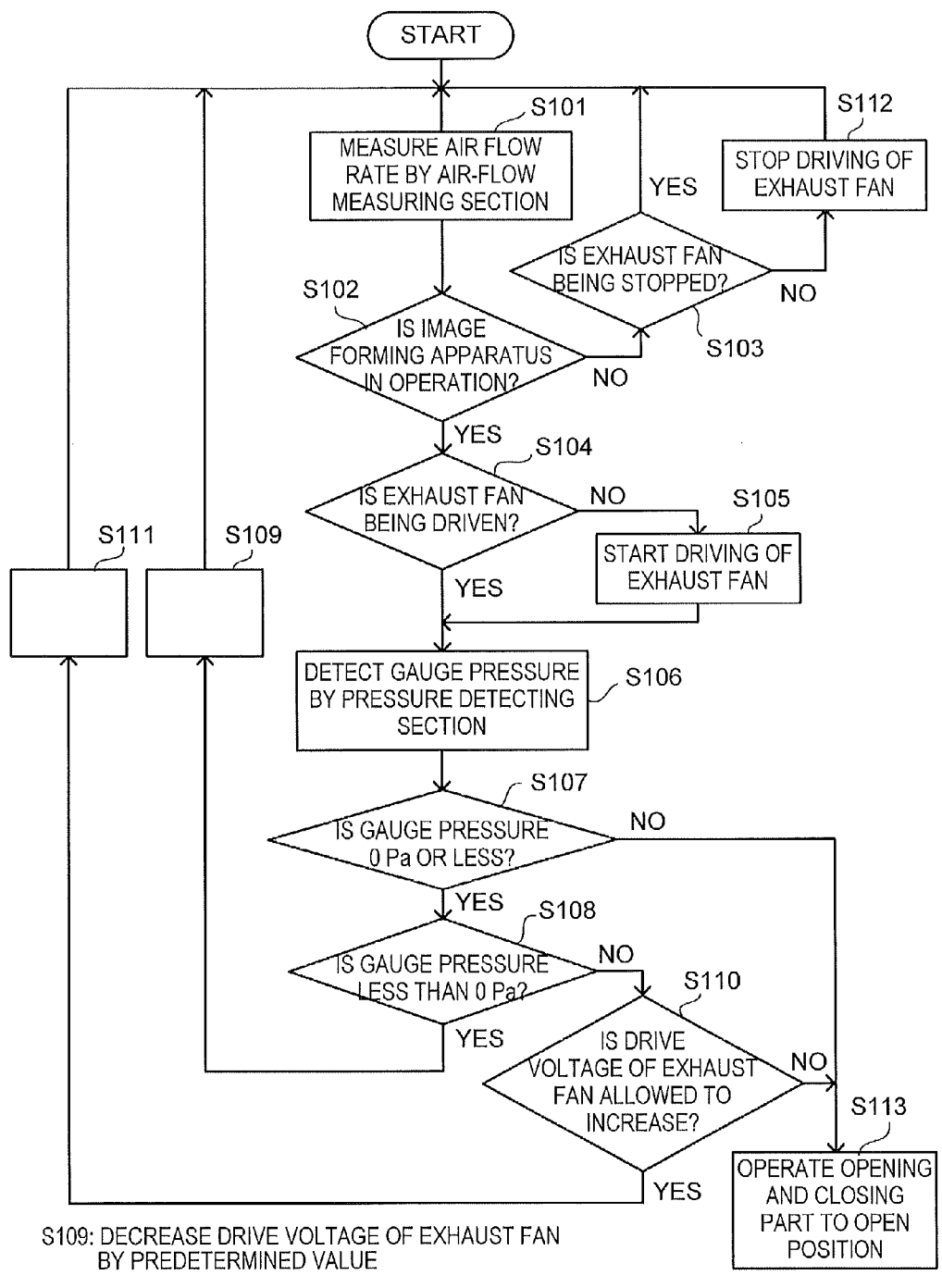
FIG. 2 is a flowchart of operations of the exhaust air cleaning apparatus in the first embodiment.

In FIG. 2 mentioned above, when the gauge pressure is equal to or more than the set pressure value (S108: NO) and the drive voltage of the exhaust fan 260 is allowed to increase more than a current state (S110: YES), the drive voltage of the exhaust fan 260 is increased by the predetermined value (S111). However, when the gauge pressure is equal to the set pressure value, the drive voltage of the exhaust fan 260 may be maintained at the current state. In this case, only when the gauge pressure exceeds the set pressure value and the drive voltage of the exhaust fan 260 is allowed to increase more than the current state, the drive voltage of the exhaust fan 260 is increased by the predetermined value. When the drive voltage of the exhaust fan 260 is to be controlled in this manner, a set pressure range having a certain width may be used instead of the set pressure value. The set pressure range can be determined within the range of 0 Pa or less and −30 Pa or more (within the appropriate pressure range).

The above explanation shows that the pressure detecting section 240 is placed at a position A in FIG. 1, upstream of the cleaning filter 250 and the exhaust fan 260 in the exhaust path in the cleaning duct 210. However, the exhaust air cleaning apparatus 200 has only to adjust the flow rate of air to be exhausted ("exhaust air-flow rate") by the exhaust fan 260 based on the pressure at the position (the pressure adjusting position) between and the exhaust fan 260 and the inflow part 221, which is the most downstream of the inflow parts 220 and 221 in the exhaust path in the cleaning duct 210. In other words, the pressure detecting section 240 may be placed at a position B in FIG. 1. In the case where the pressure detecting section 240 is placed at the position B in FIG. 1, even when the pressure at the position A rises beyond the atmospheric pressure due to clogging of the cleaning filter 250, the pressure detecting section 240 at the position B is also apt to detect the pressure equal to or lower than the atmospheric pressure. It is therefore conceived that the pressure detecting section 240 is more preferably placed at the position A rather than the position B.

Figure 3:
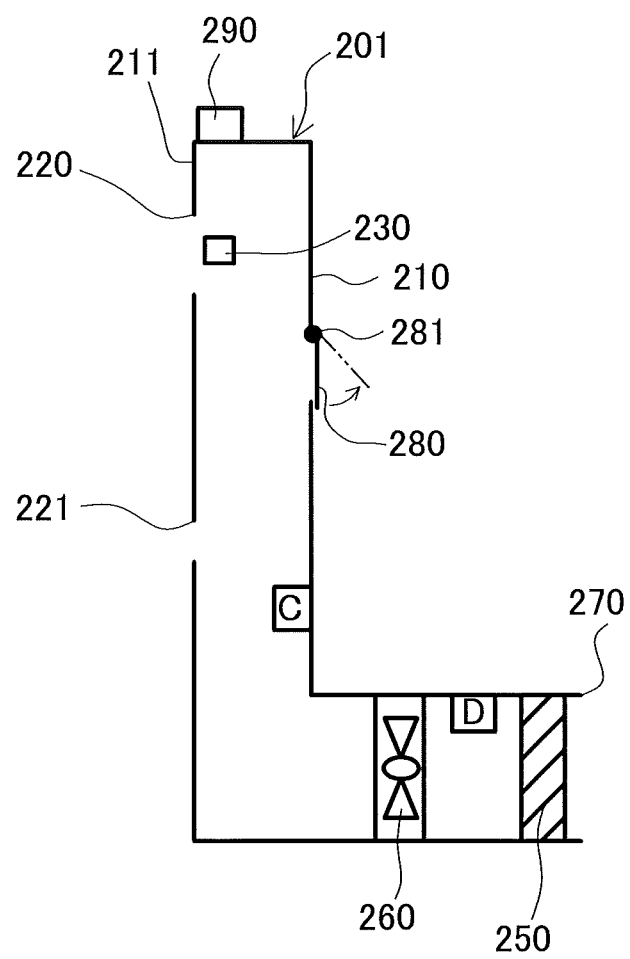
FIG. 3 is a schematic configuration view of a modified example of the exhaust air cleaning apparatus in the first embodiment.

Furthermore, as an exhaust air cleaning apparatus 201 shown in FIG. 3, the cleaning filter 250 may be placed downstream of the exhaust fan 260. That is, FIG. 3 shows the cleaning filter 250 and the exhaust fan 260 in the reversed positions from those in FIG. 1. In the case of the configuration shown in FIG. 3, the pressure detecting section 240 may be placed at either a position C or D. If the pressure detecting section 240 is placed at the position C, it is possible to directly detect the gauge pressure at the pressure adjusting position between the inflow part 221 and the exhaust fan 260. This can adjust the exhaust air-flow rate of the exhaust fan 260 based on the pressure at the position between the inflow part 221 and the exhaust fan 260 as in the case where the pressure detecting section 240 is placed at the position A or B in FIG. 1.

On the other hand, the position D in FIG. 3 is located downstream of the exhaust fan 260. Thus, if the pressure detecting section 240 is placed at the position D, the gauge pressure detected by the pressure detecting section 240 corresponds to the pressure downstream of the exhaust fan 260. However, when a relationship between the gauge pressure on the upstream side of the exhaust fan 260 and the gauge pressure on the downstream side of the same is determined in advance by experiments, the gauge pressure at the position C corresponding to the pressure adjusting position on the upstream side of the exhaust fan 260 can be determined based on a detected value of the gauge pressure at the position D on the downstream side of the exhaust fan 260.

Figure 4:
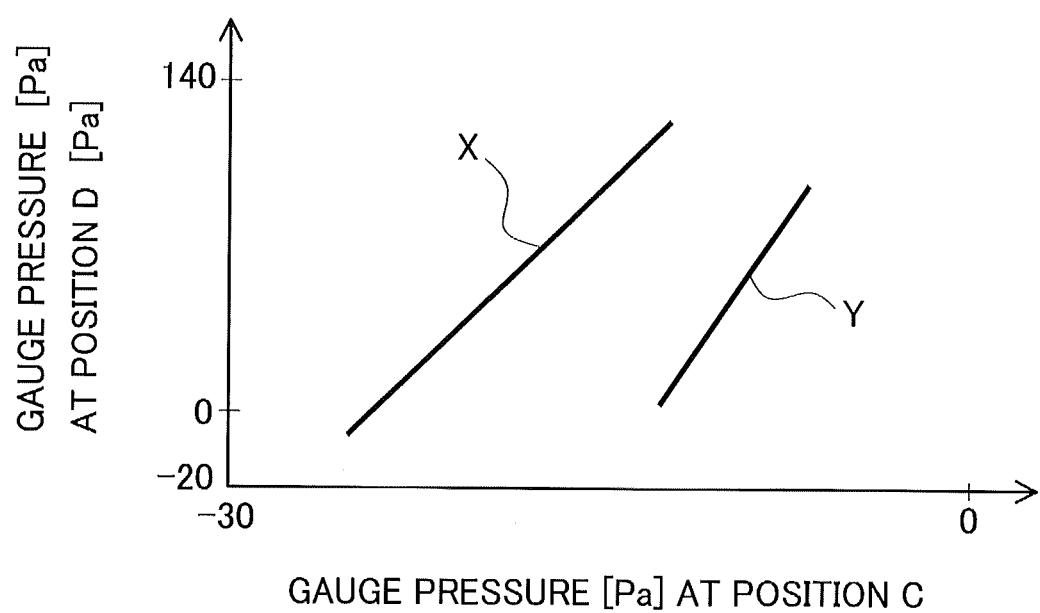
FIG. 4 is a graph showing a relationship in gauge pressure between an upstream position and a downstream position of an exhaust fan.

FIG. 4 is a graph showing a relationship between the gauge pressure at the position C and the gauge pressure at the position D. In the graph of FIG. 4, X and Y indicate exhaust air cleaning apparatuses 201 different in shape of the cleaning duct 210, exhaust air-flow rate of the exhaust fan 260, and others. As seen in FIG. 4, the relationship between the gauge pressures at the positions C and D is different between the exhaust air cleaning apparatuses 201. Accordingly, when the relationship between the gauge pressures at the positions C and D in each exhaust air cleaning apparatus 201 is determined and stored in advance in the controller 290, the controller 290 can determine the gauge pressure at the position C from a detected value of the gauge pressure detected by the pressure detecting section 240 placed at the position D. Even in the configuration that the pressure detecting section 240 is placed at the position D, accordingly, it is possible to adjust the exhaust air-flow rate of the exhaust fan 260 based on the pressure at the pressure adjusting position between the inflow part 221 and the exhaust fan 260.

Second Embodiment

A second embodiment will be explained below. An exhaust air cleaning apparatus in this embodiment is configured to adjust the pressure in the cleaning duct by use of a valve, differently from the first embodiment. To be specific, the exhaust air cleaning apparatus in the second embodiment includes an opening and closing valve on a wall surface of the cleaning duct and is arranged to adjust the pressure in the cleaning duct to fall within an appropriate range.

Figure 5:
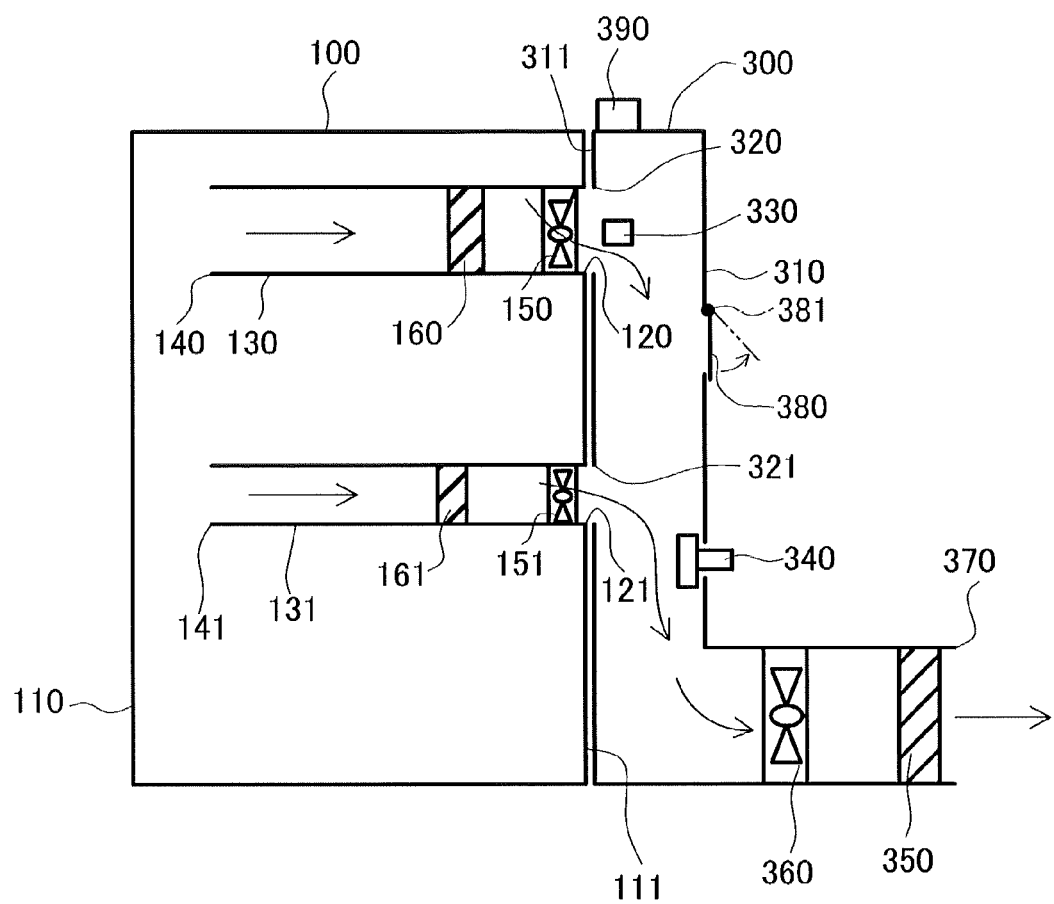
FIG. 5 is a schematic configuration view of an exhaust air cleaning apparatus used in an image forming apparatus in a second embodiment.

FIG. 5 shows an exhaust air cleaning apparatus 300 in the second embodiment. The image forming apparatus 100 in the present embodiment is identical to that in the first embodiment shown in FIG. 1. In the exhaust air cleaning apparatus 300, similarly, a cleaning duct 310 has an attachment surface 311 with which the exhaust air cleaning apparatus 300 is attached to the rear surface 111 of the image forming apparatus 100. The attachment surface 311 of the exhaust air cleaning apparatus 300 is formed with inflow parts 320 and 321 in positions respectively corresponding to the exhaust ports 120 and 121 of the image forming apparatus 100. The exhaust air cleaning apparatus 300 further includes an air-flow measuring section 330, a cleaning filter 350, and an exhaust fan 360 which are identical to those in the exhaust air cleaning apparatus 200 in the first embodiment.

In the present embodiment, the exhaust fan 360 is driven under control of the controller 390. However, differently from the first embodiment, the exhaust fan 360 in the second embodiment is driven by fixed drive voltage enabling discharge of a larger flow rate of air through a discharge port 370 than the sum of the flow rates of air exhausted through the exhaust ports 120 and 121 of the image forming apparatus 100.

An opening and closing part 380 in the second embodiment is configured to be held in a closed position in a normal state where the pressure in the cleaning duct 310 is equal to or less than atmospheric pressure and to be moved to an open position by the pressure in the cleaning duct 310 when this pressure exceeds the atmospheric pressure. In the present embodiment, in the exhaust path in the cleaning duct 310, the exhaust fan 360 and the cleaning filter 350 are arranged from upstream to downstream in this order.

The exhaust air cleaning apparatus 300 in the second embodiment, differently from the first embodiment, includes an opening and closing valve 340 in a pressure adjusting position between the inflow part 321 and the exhaust fan 360. The opening and closing valve 340 functions to adjust the pressure in the cleaning duct 310 during operation of the image forming apparatus 100 to continuously fall within an appropriate range.

Figure 6:
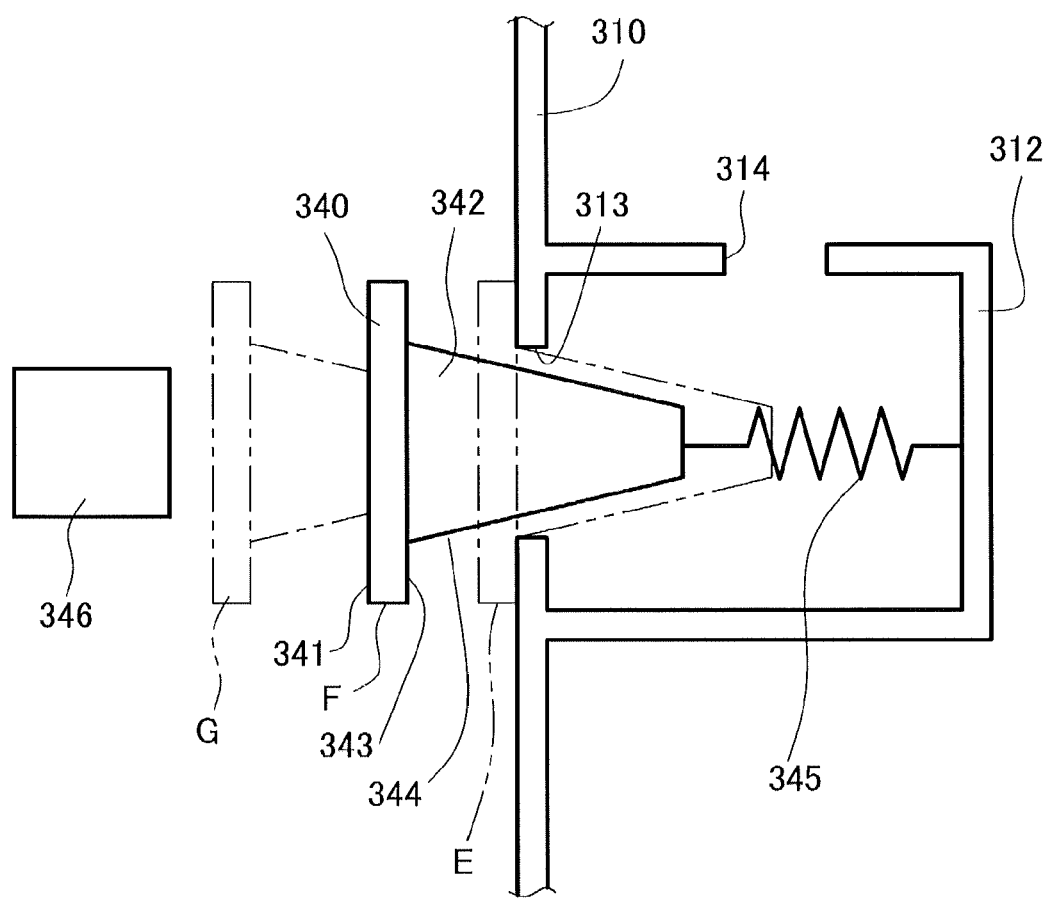
FIG. 6 is a diagram to explain an opening and closing valve of the exhaust air cleaning apparatus in the second embodiment.

FIG. 6 is an enlarged view of the opening and closing valve 340 and its surroundings shown in FIG. 5. The left side from the wall surface of the cleaning duct 310 in FIG. 6 corresponds to the inside of the cleaning duct 310 and the right side corresponds to the outside of the cleaning duct 310. The opening and closing valve 340 is an elastic body including a valve part 341 and a shaft part 342. The opening and closing valve 340 is placed with the shaft part 342 inserted in an opening 313 formed in the wall surface of the cleaning duct 310. The shaft part 341 is a portion larger in diameter than the shaft part 342 and has a seat surface 343 on which the shaft part 342 is provided. Since the valve part 341 has a larger diameter than the opening 313, the opening 313 is closed by the seat surface 343 of the valve part 341 when the opening and closing valve 340 is placed at a position E indicated with a double dashed line in FIG. 6. The shaft part 342 has a diameter increasing toward the seat surface 343 of the valve part 341. That is, the shaft part 342 has a tapered outer peripheral surface 344.

A casing part 312 is provided outside and surrounding the opening 313 of the cleaning duct 310. The shaft part 342 of the opening and closing valve 340 is connected to an inner wall surface of a right side wall of the casing part 312 as shown in FIG. 6 with a tension spring 345. Accordingly, the opening and closing valve 340 is continuously subjected to tensile force acting rightward in FIG. 6 from the tension spring 345.

The internal space of the casing part 312 is continuous with the inside of the cleaning duct 310 through the opening 313. Furthermore, an upper wall of the casing part 312 in FIG. 6 is formed with an opening 314 through which the internal space of the casing part 312 is also continuous with the outside of the casing part 312. Specifically, when the opening and closing valve 340 is placed at a position more leftward than the position indicated by the double dashed line E, the opening 313 is not fully closed by the opening and closing valve 340, thus allowing communication between the inside to the outside of the cleaning duct 310.

When the opening and closing valve 340 receives leftward force in FIG. 6 larger than the tensile force of the tension spring 345, the opening and closing valve 340 is moved to a position more leftward than the position E. To be concrete, in the present embodiment, when the pressure in the cleaning duct 310 is less than the atmospheric pressure, the opening and closing valve 340 is subjected to the tensile force acting leftward by the action of the negative pressure in the cleaning duct 310. As the pressure in the cleaning duct 310 is lower, the tensile force pulling the opening and closing valve 340 leftward is larger. The opening and closing valve 340 is thus moved to a position more leftward.

Accordingly, when the opening and closing valve 340 is located at a position F indicated by a solid line or at a position G indicated by a double dashed line in FIG. 6, it represents that the pressure in the cleaning duct 310 is less than atmospheric pressure. When the opening and closing valve 340 is located at the position G, it represents that the pressure in the cleaning duct 310 is lower than that when the opening and closing valve 340 is located at the position F. The position G is a leftmost end of a movable range of the opening and closing valve 340, so that this valve 340 is held against leftward movement more than that end.

In the opening and closing valve 340 in the present embodiment, the tensile force of the tension spring 345 is determined to allow the valve 340 to move to a position more leftward than the position E when the pressure in the cleaning duct 310 is less than the atmospheric pressure. The tensile force of the tension spring 345 is also determined to allow the opening and closing valve 340 to further move to the position G when the gauge pressure in the cleaning duct 310 is less than −30 Pa. An opening-and-closing-valve detecting section 346 is arranged to detect the presence of the opening and closing valve 340 when the valve 340 is located at the position G. When this detecting section 346 detects the presence of the valve 340, the detecting section 346 outputs a signal representing that the opening and closing valve 340 is located at the position G, i.e., at the movable end, to the controller 390.

As described above, the outer peripheral surface 344 of the shaft part 342 of the opening and closing valve 340 is a tapered surface. Thus, as the opening and closing valve 340 is located more leftward in FIG. 6, a clearance between the outer peripheral surface 344 and the opening 313 is larger. That is, as the opening and closing valve 340 is positioned more leftward in FIG. 6, a larger amount of air allowed to pass through the clearance between the outer peripheral surface 344 and the opening 313 to flow into the cleaning duct 310. Accordingly, as the pressure in the cleaning duct 310 is lower, the opening and closing valve 340 allows a larger amount of air to be taken from outside to inside of the cleaning duct 310, thereby increasing the pressure in the cleaning duct 310.

Figure 7:
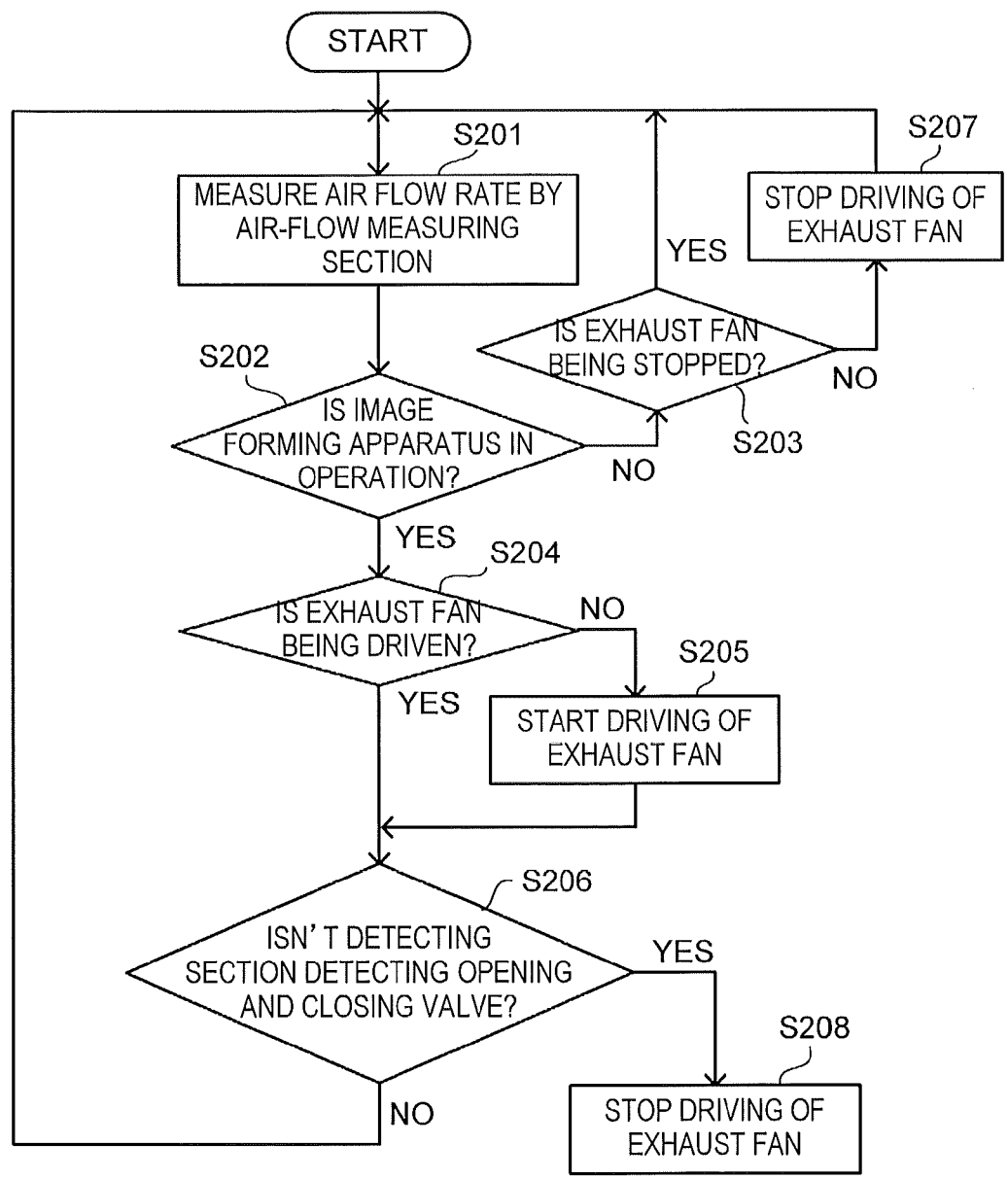
FIG. 7 is a flowchart of operations of the exhaust air cleaning apparatus in the second embodiment.

FIG. 7 is a flowchart of operations of the exhaust air cleaning apparatus 300 in the second embodiment. When the power of the exhaust air cleaning apparatus 300 is tuned on, the controller 390 judges whether or not the image forming apparatus 100 is in operation (S202) based on a measured value of an air flow rate transmitted from the air-flow measuring section 330 (S201). When the image forming apparatus 100 is not in operation (S202: NO), the exhaust fan 360 is held stopped (S203: YES).

When the image forming apparatus 100 starts to operate (S202: YES), the exhaust fan 360 being stopped (S204: NO) starts to be driven (S205). Then, it is judged whether or not the opening-and-closing-valve detecting section 346 detects the presence of the opening and closing valve 340 (S206).

At that time, the pressure in the cleaning duct 310 is equal to or less than atmospheric pressure. This is because the exhaust fan 360 can discharge a larger flow rate of air through the discharge port 370 than the sum of flow rates of the air exhausted through the exhaust ports 120 and 121 of the image forming apparatus 100. In the normal state, furthermore, the pressure in the cleaning duct 310 is −30 Pa or more in gauge pressure. As the pressure in the cleaning duct 310 is lower, the opening and closing valve 340 allows a larger amount of air to flow from outside to inside of the cleaning duct 310, thereby increasing the pressure in the cleaning duct 310.

Specifically, in the normal state, the internal pressure in the cleaning duct 310 has been adjusted to fall within the range of 0 Pa to −30 Pa inclusive (within the appropriate pressure range) in gauge pressure. Therefore, the presence of the opening and closing valve 340 is not detected by the detecting section 346 (S206: NO). Accordingly, returning to step S201, when the image forming apparatus 100 continues to operate (S202: YES), the exhaust fan 360 is continuously driven (S204: YES). For this period, in the exhaust air cleaning apparatus 300 in the present embodiment, the pressure in the cleaning duct 310 is also adjusted to fall within the range of 0 Pa to −30 Pa inclusive (within the appropriate pressure range).

When the image forming apparatus 100 is judged to be stopped operating during driving of the exhaust fan 360 (S202: NO), the controller 390 also stops, in step S207, driving of the exhaust fan 360 in operation (S203: NO). On the other hand, when the pressure in the cleaning duct 310 exceeds the atmospheric pressure even though the exhaust fan 360 is being driven, the opening and closing part 380 is operated to an open position by that increased pressure in the cleaning duct 310.

Furthermore, when the exhaust fan 360 is in the driven state and the detecting section 346 detects the presence of the opening and closing valve 340 (S206: YES), the controller 390 stops driving of the exhaust fan 360 (S208). When the gauge pressure in the cleaning duct 310 is less than −30 Pa, it may adversely affect the image forming apparatus 100 and images to be formed by the image forming apparatus 100.

In the opening and closing valve 340, the tensile force of the tension spring 345 is required only to adjust the pressure in the cleaning duct 310 to fall within the range of 0 Pa to −30 Pa inclusive (within the appropriate pressure range). Specifically, in FIG. 6, for example, the tensile force of the tension spring 345 can be determined so that the opening and closing valve 340 is located at the position E when the gauge pressure in the cleaning duct 310 exceeds −10 Pa, while the valve 340 is located at a position more leftward than the position E when the gauge pressure becomes −10 Pa or lower. The tensile force of the tension spring 345 may be determined so that the opening and closing valve 340 reaches the position G when the gauge pressure in the cleaning duct 310 is −20 Pa.

As an alternative, a compression spring functioning to urge the opening and closing valve 340 rightward in FIG. 6 may also be used instead of the tension spring 345. As another alternative, the opening and closing valve 340 may be configured to move to right and left in FIG. 6 under control based on the pressure in the cleaning duct 310. Specifically, a pressure detecting section for detecting the pressure at a position between the inflow part 321 and the exhaust fan 360 in the cleaning duct 310 may be provided, so that the valve 340 is controlled to move to a more rightward position (toward the position E) in FIG. 6 when a pressure detected value is higher than a predetermined value (e.g., −10 Pa) and to a more leftward position in FIG. 6 when the pressure detected value is lower than the predetermined value.

Further, a sensor for detecting the opening and closing part 380 in the open position may be provided to inform a user that the time for replacement of the cleaning filter 350 has come or of breakage or the service life of the exhaust fan 360. When the opening and closing part 380 is placed in the open position, it is also conceivable that driving of the exhaust fan 360 could be stopped. In addition, similar to the first embodiment, the second embodiment may include a sensor for detecting the pressure in the cleaning duct 310 when this pressure exceeds atmospheric pressure, so that based on this detection the controller 390 controls the opening and closing part 380 to be placed in the open position.

The air-flow measuring section 330 may be provided near the inflow part 321 in the cleaning duct 310 to measure the flow rate of air exhausted through the exhaust port 121 or the air-flow measuring sections 330 may be provided one each near the inflow parts 320 and 321 to measure both the flow rates of air exhausted through the exhaust ports 120 and 121.

Furthermore, the cleaning filter 350 and the exhaust fan 360 may be arranged as shown in FIG. 1 in reversed positions from those in FIG. 5.

Third Embodiment

A third embodiment will be explained below. An exhaust air cleaning apparatus in this embodiment, differently from the first and second embodiments, includes an opening and closing gate provided in an exhaust path to adjust the pressure in the cleaning duct. In detail, the exhaust air cleaning apparatus in the third embodiment is configured to adjust air flow resistance in the cleaning duct by use of the opening and closing gate, thereby adjusting the pressure in the cleaning duct to fall within the appropriate range.

Figure 8:
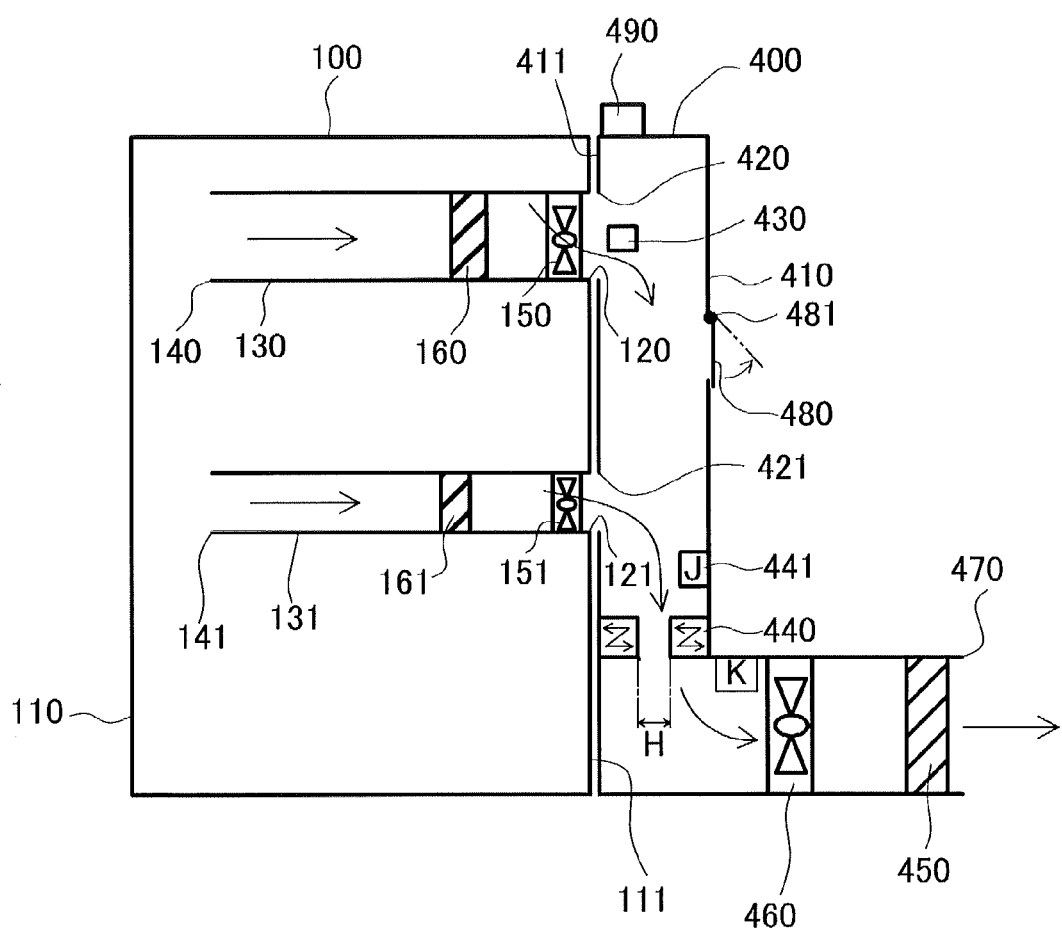
FIG. 8 is a configuration view of an exhaust air cleaning apparatus used in an image forming apparatus in a third embodiment.

FIG. 8 shows an exhaust air cleaning apparatus 400 in the third embodiment. The image forming apparatus 100 in the present embodiment is identical to that in the first embodiment shown in FIG. 1. Similarly, in the exhaust air cleaning apparatus 400, a cleaning duct 410 has an attachment surface 411 with which the exhaust air cleaning apparatus 400 is attached to the rear surface 111 of the image forming apparatus 100. Furthermore, the attachment surface 411 of the exhaust air cleaning apparatus 400 is formed with inflow parts 420 and 421 in positions corresponding to the exhaust ports 120 and 121 of the image forming apparatus 100. In addition, the exhaust air cleaning apparatus 400 further includes an air-flow measuring section 430, a cleaning filter 450, an exhaust fan 460, and an opening and closing part 480, which are similar to those of the exhaust air cleaning apparatus 200 in the first embodiment. The opening and closing part 480 in the third embodiment is also controlled to open and close by a controller 490 as in the first embodiment.

The driving of the exhaust fan 460 in the present embodiment is controlled by the controller 490. The exhaust fan 460 in the present embodiment is driven by fixed drive voltage to enable exhaust of a larger flow rate of air than the sum of flow rates of air exhausted through the exhaust ports 120 and 121 of the image forming apparatus 100 in a similar manner to in the second embodiment.

The opening and closing part 480 in the present embodiment is configured to be normally held in a closed position and operated to an open position by the pressure in the cleaning duct 410 when this pressure exceeds atmospheric pressure. In the present embodiment, the exhaust fan 460 and the cleaning filter 450 are arranged from upstream to downstream in this order in the exhaust path in the cleaning duct 410.

The exhaust air cleaning apparatus 400 in the present embodiment, differently from those in the first and second embodiments, includes the opening and closing gate 440 at a position between the inflow part 421 and the exhaust fan 460 as shown in FIG. 8. Further, a pressure detecting section 441 is provided at a pressure adjusting position between the inflow part 421 and the opening and closing gate 440. The pressure detecting section 441 is used to detect gauge pressure at that position and outputs a detected value thereof to the controller 490.

The opening and closing gate 440 is placed with a clearance H as shown in FIG. 8. The opening and closing gate 440 is operated to open and close in a right-left direction (a horizontal direction) in FIG. 8, thereby adjusting the size of the clearance H. Specifically, the opening and closing gate 440 can adjust an opening area in the cleaning duct 410 at that position. When this gate 440 is opened, increasing the clearance H, to reduce air flow resistance at that position, the pressure on the upstream side of the gate 440 is decreased. On the other hand, when the gate 440 is closed, decreasing the clearance H, to increase the air flow resistance at that position, the pressure on the upstream side of the gate 440 is increased. In the exhaust air cleaning apparatus 440 in the present embodiment, adjustment of the opening degree of the gate 440 enables adjusting the pressure in the cleaning duct 410 during operation of the image forming apparatus 100 to fall within an appropriate range.

Figure 9:
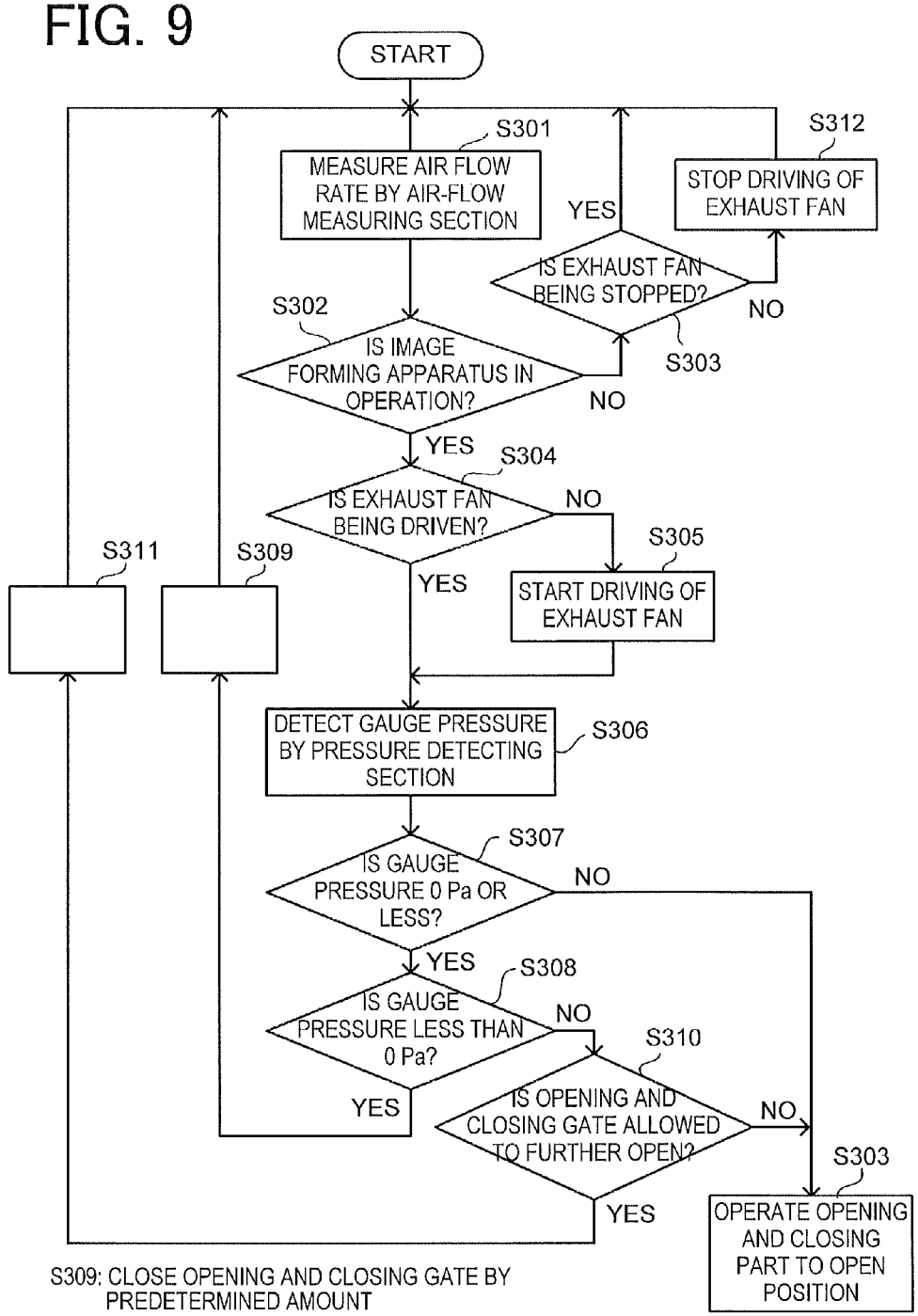
FIG. 9 is a flowchart of operations of the exhaust air cleaning apparatus in the third embodiment.

FIG. 9 is a flowchart of operations of the exhaust air cleaning apparatus 400 in the present embodiment. When the power of the exhaust air cleaning apparatus 400 is turned on, the controller 490 judges whether or not the image forming apparatus 100 is in operation (S302) based on a measured value of the air flow rate transmitted from the air-flow measuring section 430 (S301). When the image forming apparatus 100 is not in operation, i.e., is in a stopped state (S302: NO), the exhaust fan 460 is held stopped (S303: YES).

When the image forming apparatus 100 starts to operate (S302: YES), the exhaust fan 460 being stopped (S304: NO) starts to be driven (S305). Successively, the controller 490 judges whether or not the gauge pressure detected by the pressure detecting section 441 (S306) is 0 Pa or less (S307). At that time, the pressure in the cleaning duct 410 is normally equal to or less than atmospheric pressure because the exhaust fan 460 can discharge a larger flow rate of air through the discharge port 470 than the sum of flow rates of air exhausted through the exhaust ports 120 and 121 of the image forming apparatus 100.

When the gauge pressure is 0 Pa or less (S307: YES), it is judged whether or not the gauge pressure is equal to or more than a set pressure value (S308). The set pressure value is a pressure value that does not cause any problems such as leakage of exhaust air before cleaning and adverse influences on the image forming apparatus 100. This set pressure value is determined in advance to a value within a range of 0 Pa to −30 Pa inclusive (within an appropriate pressure range) in gauge pressure.

When the gauge pressure is less than the set pressure value (S308: YES), the opening and closing gate 440 is closed by a predetermined amount to increase the pressure on the upstream side of the gate 440 (S309). On the other hand, when the gauge pressure is equal to or more than the set pressure value (S308: NO) and the gate 440 is allowed to open more than a current state (S310: YES), the gate 440 is opened by a predetermined amount to decrease the pressure on the upstream side of the gate 440 (S311). After the opening degree of the gate 440 is adjusted (S309, S311), the processing returns to step S301.

Specifically, while the image forming apparatus 100 continues to operate (S302: YES) and the exhaust fan 460 is being driven (S304: YES), the opening degree of the opening and closing gate 440 is adjusted (S309, S311) based on the gauge pressure (S307, S308, S310). When the controller 490 judges that the operation of the image forming apparatus 100 is stopped during driving of the exhaust fan 460 (S302: NO), the controller 490 stops driving of the exhaust fan 460 being driven (S303: NO) (S312).

When the gauge pressure detected by the pressure detecting section 441 exceeds 0 Pa (S307: NO) even though the exhaust fan 460 is being driven, the opening and closing part 480 is operated to the open position (S313). When the gauge pressure detected by the pressure detecting section 441 is equal to or more than the set pressure value (S308: NO) and the gate 440 is not allowed to open more than the current state (S310: NO) even though the exhaust fan 460 is being driven, the opening and closing part 480 is operated to the open position (S313). In the exhaust air cleaning apparatus 400, the pressure on the upstream side of the gate 440 in the cleaning duct 410 is adjusted to fall within the range of 0 Pa or less and −30 Pa or more (within the appropriate pressure range).

In the above configuration, when the opening and closing part 480 is operated to the open position, it may be arranged to inform a user that the time for replacement of the cleaning filter 450 has come or of the breakdown or the service life of the exhaust fan 460. It is also conceivable that driving of the exhaust fan 460 could be stopped. As another alternative, it may be configured such that when the pressure on the upstream side of the opening and closing gate 440 in the cleaning duct 410 exceeds the atmospheric pressure, the opening and closing part 480 is opened by that increased pressure. The air-flow measuring section 430 may be provided near the inflow part 421 in the cleaning duct 410 to measure the flow rate of air exhausted through the exhaust port 121 or the air-flow measuring sections 430 may be provided one each near the inflow parts 420 and 421 to measure both the flow rates of air exhausted through the exhaust ports 120 and 121. In addition, the cleaning filter 450 and the exhaust fan 460 may be arranged as shown in FIG. 1 in reversed positions from those in FIG. 8.

In FIG. 9 mentioned above, when the gauge pressure is equal to or more than the set pressure value (S308: NO) and the gate 440 is allowed to open more than the current state (S310: YES), the gate 440 is opened by the predetermined amount, decreasing the pressure on the upstream side of the gate 440 (S311). However, when the gauge pressure is equal to the set pressure value, the opening degree of the gate 440 may be maintained in the current state. In this case, only when the gauge pressure exceeds the set pressure value and the gate 441 is allowed to open more than the current state, the gate 440 has only to be opened by the predetermined amount, thereby decreasing the pressure on the upstream side of the gate 440. When the opening degree of the gate 440 configured as above is to be controlled, a set pressure range having a certain width may be used instead of the set pressure value. The set pressure range can be determined within the range of 0 Pa or less and −30 Pa or more (within the appropriate pressure range).

The above explanation shows the configuration that the pressure detecting section 441 is placed at a position J in FIG. 8. The pressure detecting section 441 may also be arranged at a position K. In this case, the relationship between the gauge pressure on the upstream side of the gate 440 and the gauge pressure on the downstream side of the same are determined in advance by experiments or the like. Based on a detected value of the gauge pressure at the position K downstream of the gate 440, the gauge pressure at the position J upstream of the gate 440 may be determined.

As explained above in detail, each of the aforementioned exhaust air cleaning apparatuses 200, 300, and 400 includes the cleaning duct attached to the image forming apparatus 100 to clean or purify exhaust air exhausted through the exhaust ports 120 and 121. In the cleaning duct, there are provided the exhaust fan and the cleaning filter. Furthermore, the exhaust air cleaning apparatuses 200, 300, and 400 are each configured to clean or purify the air exhausted from the image forming apparatus 100 by adjusting the pressure at a position between the most downstream inflow part and the exhaust fan to an appropriate value equal to or less than atmospheric pressure. This can achieve an exhaust air cleaning apparatus capable of appropriately collecting by-products generated during image formation while suppressing the adverse influences on the devices or units for image formation and the quality deterioration of images to be formed.

The above embodiments are mere examples of the present invention and do not limit the invention. Thus, the present invention may be embodied in other specific forms without departing from the essential characteristics thereof. For instance, the above embodiments exemplify the exhaust air cleaning apparatus used in the image forming apparatus 100 having two exhaust ports; however, the invention is not limited to this. When the image forming apparatus has a single exhaust port or three or more exhaust ports, an exhaust air cleaning apparatus may be provided with an inflow part or inflow parts in a position(s) corresponding to the exhaust port(s).

Fourth Embodiment

A fourth embodiment will be explained below. The present embodiment is directed to an image forming apparatus, differently from the first to third embodiments directed to the exhaust air cleaning apparatus. The image forming apparatus in the fourth embodiment is configured to adjust the pressure in the cleaning duct to exhaust air from inside to outside of the apparatus to fall within an appropriate range.

Figure 10:
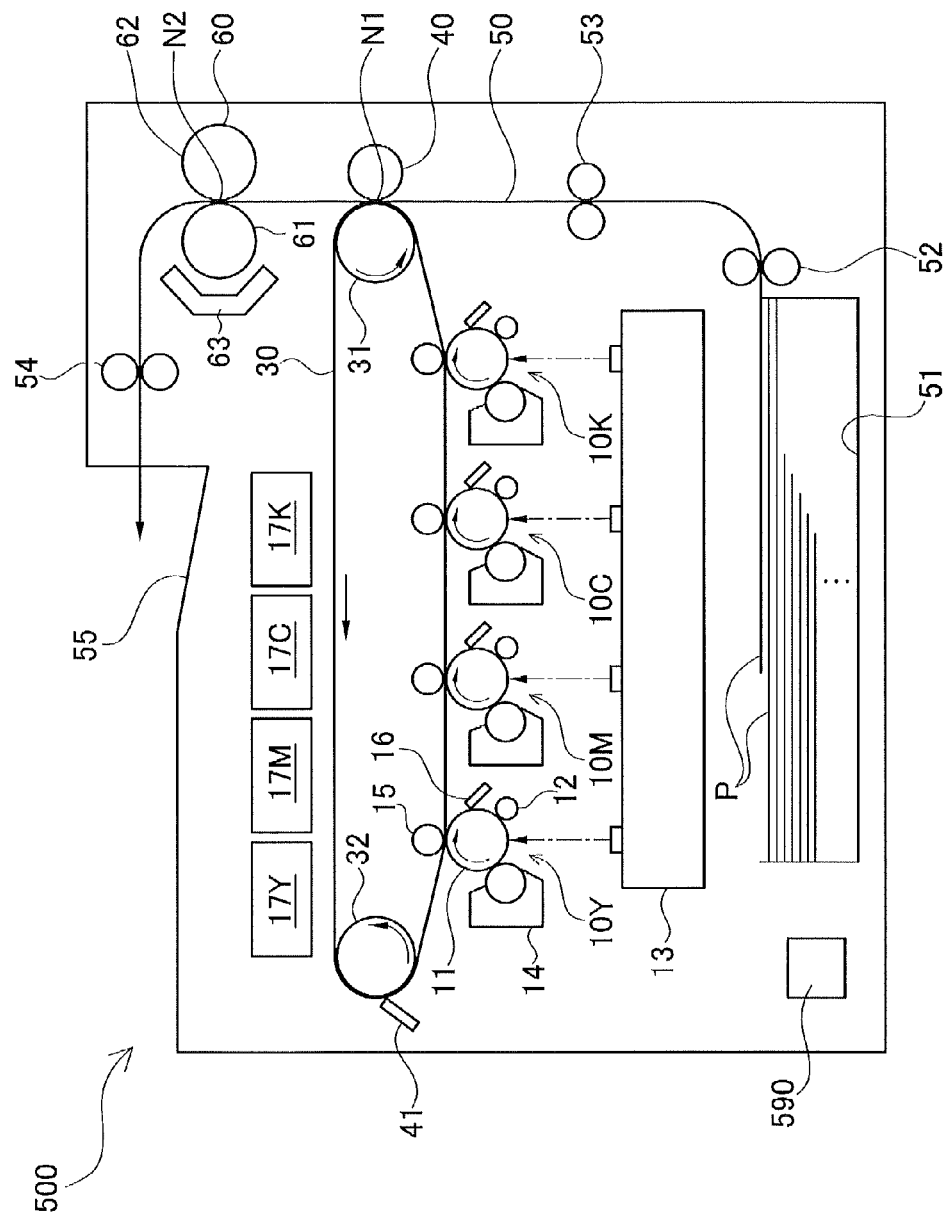
FIG. 10 is a schematic configuration view showing a structure for performing image formation in an image forming apparatus in a fourth embodiment.

An image forming apparatus 500 in the present embodiment is a tandem type image forming apparatus capable of forming color images as shown in FIG. 10. An intermediate transfer belt 30 is wound over a drive roller 31 and a stretching roller 32. In a middle zone in the image forming apparatus 500, from left to right in the figure, four-color image forming units for yellow 10Y, magenta 10M, cyan 10C, and black 10K are arranged in this order along the intermediate transfer belt 30. A belt cleaner 41 is provided in contact with a left end of the belt 30 in the figure.

In a lower zone of the image forming apparatus 500 in FIG. 10, a sheet feeding cassette 51 is detachably mounted. Further, on the right side in the figure, a conveying path 50 is provided from bottom to top. Along this path 50, in the order from bottom, sheet feed rollers 52, resist rollers 53, a secondary transfer nip point N1, a fixing unit 60, and sheet output rollers 54. On the upper surface of the image forming apparatus 500, a sheet output tray 55 is provided.

The fixing unit 60 is an electromagnetic induction heating type fixing device including a fixing roller 61, a pressure roller 62, and an induction heater 63. The fixing unit 60 is configured to heat and press a sheet P at a fixing nip N2 formed by the fixing roller 61 and the pressure roller 62 in pressure contact therewith to perform a fixing process of a toner image transferred onto the sheet P.

Each of the four-color image forming units 10Y, 10M, 10C, and 10K includes a charger 12, a developer 14, and a photoconductor cleaner 16 which are arranged around a photoconductor 11. Furthermore, a primary transfer roller 15 is placed in a position opposed to the photoconductor 11 with respect to the belt 30. Furthermore, an exposer 13 is placed under the four-color image forming units 10Y, 10M, 10C, and 10K in FIG. 10.

The charger 12 is used to uniformly charge the surface of the corresponding photoconductor 11. The exposer 13 is used to irradiate a laser beam to the surface of each photoconductor 11 based on image data to form an electrostatic latent image. The developer 14 is used to supply toner stored therein to the surface of the corresponding photoconductor 11. The primary transfer roller 15 is placed in pressure contact with the intermediate transfer belt 30 in a direction perpendicular to the axis of the roller 15 (in a downward direction in FIG. 10). In each contact area between the belt 30 and each photoconductor 11 made contact therewith by the pressure contact, a primary transfer nip is formed whereby a toner image on each-color photoconductor 11 is transferred onto the belt 30. The photoconductor cleaner 16 is used to collect toner left on the corresponding photoconductor 11 without being transferred from the photoconductor 11 to the belt 30.

Above the intermediate transfer belt 30 in FIG. 1, there are arranged hoppers 17Y, 17M, 17C, and 17K storing toner of respective colors. The four-color toners stored one in each of the hoppers are appropriately supplied to the corresponding color developers 14.

As shown in FIG. 10, the image forming apparatus 500 includes a controller 590. This controller 590 is configured to control the entire apparatus, thereby operating each part or unit of the apparatus to form an image on a sheet P. The controller 590 also controls an exhaust fan mentioned later.

One example of image forming operations using the image forming apparatus 500 in the present embodiment will be briefly explained. During image formation, firstly, the intermediate transfer belt 30 and the photoconductors 11 one for each color are individually rotated in a direction indicated by arrows in FIG. 10 at a predetermined circumferential velocity. The outer peripheral surfaces of the photoconductors 11 are almost uniformly charged by the corresponding chargers 12. Then, the exposer 13 projects light to the charged outer peripheral surface of each photoconductor 11 according to image data to form electrostatic latent images thereon. The electrostatic latent images are developed by the developers 14 and formed as toner images on the photoconductors 11.

The toner image formed on each photoconductor 11 is transferred (Primary transfer) onto the intermediate transfer belt 30 by the corresponding primary transfer roller 15. Thus, the yellow, magenta, cyan, and black toner images are superimposed in this order on the belt 30. The four-color superimposed toner image is conveyed to the secondary transfer nip N1 by rotation of the belt 30. Residual toner untransferred to the belt 30 and still left on the photoconductors 11 after passing the primary transfer rollers 15 are scraped by the photoconductor cleaners 16 and removed from the photoconductors 11.

On the other hand, the sheets P stacked in the sheet feeding cassette 51 are picked one by one from an uppermost sheet onto the conveying path 50. The picked sheet P is conveyed along the conveying path 50 to the secondary transfer nip N1. The arrival timing of each sheet P to the secondary transfer nip N1 is adjusted by the resistor rollers 53 to synchronize with the arrival timing of a toner image on the belt 30 to the secondary transfer nip N1. In the secondary transfer nip N1, accordingly, four-color superimposed toner image is transferred (Secondary transfer) onto the sheet P.

The sheet P with the toner image transferred thereon is further conveyed downstream along the conveying path 50. Specifically, the sheet P is subjected to the fixing process of the toner image at the fixing nip N2 in the fixing unit 60 and then is discharged onto the sheet output tray 55 by the sheet output rollers 54. It is to be noted that residual toner still left on the intermediate transfer belt 30 even after passing through the secondary transfer nip N1 is collected by the belt cleaner 41. Accordingly, the residual toner is removed from the belt 30.

Figure 11:
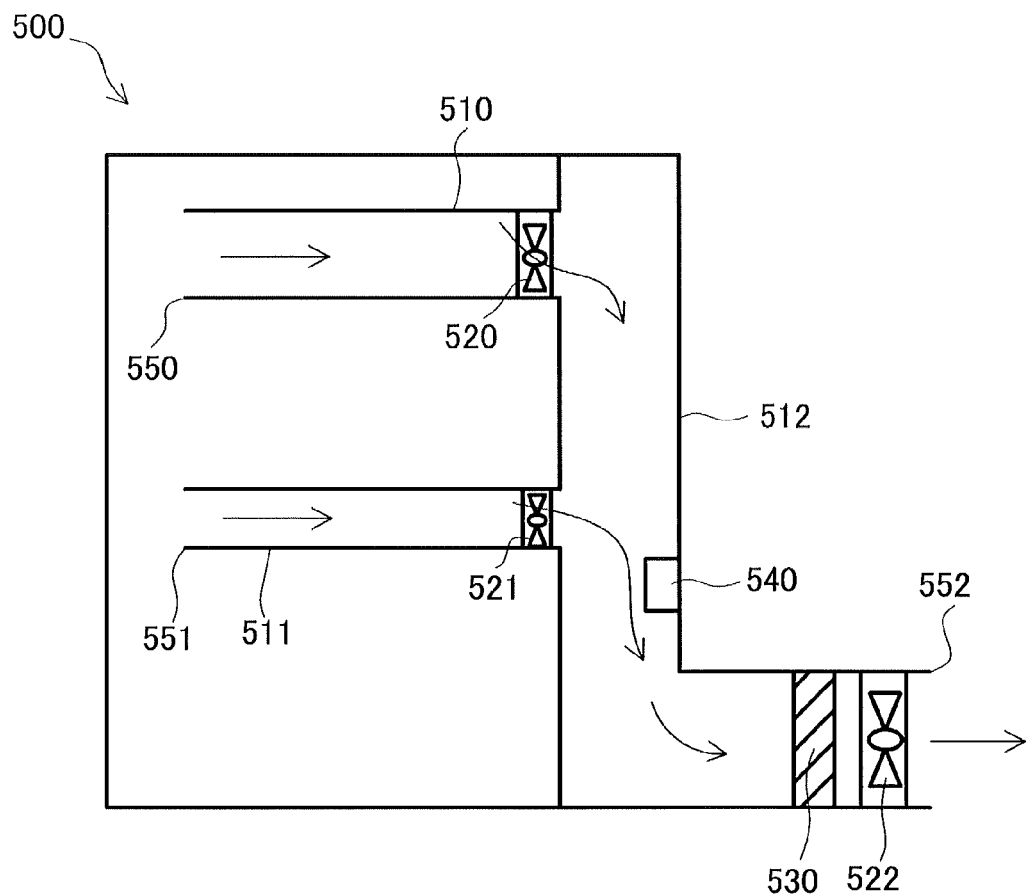
FIG. 11 is a schematic configuration view showing a structure for performing exhaust of air from the image forming apparatus in the fourth embodiment.

The image forming apparatus 500 in the present embodiment includes an exhaust port 552 to exhaust air from inside to outside of the apparatus 500 as shown in FIG. 11. The apparatus 500 is further internally provided with a second exhaust duct 512 communicated with the exhaust port 552. The second exhaust duct 512 is connected to first exhaust ducts 510 and 511 respectively having suction ports 550 and 551 each opening in the apparatus 500. The suction ports 550 and 551 are both open near the developer 14, the fixing unit 60, and others.

In the first exhaust ducts 510 and 511, first exhaust fans 520 and 521 are respectively provided. The first exhaust fans 520 and 521 are each configured to cause air in the first exhaust ducts 510 and 511 to flow in the second exhaust duct 512.

In the second exhaust duct 512, furthermore, a pressure detecting section 540, a second exhaust fan 522, and a filter 530 are provided. The pressure detecting section 540 is a pressure sensor for detecting the pressure at that position. In the present embodiment, the pressure detecting section 540 is used to detect gauge pressure indicative of a difference between absolute pressure and atmospheric pressure.

The second exhaust fan 522 is used to exhaust the air from inside to outside of the second exhaust duct 512 through the exhaust port 552. The second exhaust fan 522 has specifications that, while the second exhaust fan 522 open to atmosphere on both its suction side and discharge side discharges a larger flow rate of air than the sum of flow rates of air discharged through the first exhaust fans 520 and 521 similarly open to atmosphere. The second exhaust fan 522 can increase a discharge air-flow rate as drive voltage of the fan 522 is increased. The filter 530 is arranged to collect by-products contained in the air passing the filter 530 based on a fixed standard.

All the pressure detecting section 540, the second exhaust fan 522, the filter 530 are arranged in the exhaust path in the second exhaust duct 512, between the exhaust port 552 and a most downstream one of connection parts between the second exhaust duct 512 and the first exhaust ducts 510 and 511. The pressure detecting section 540 is arranged between the second exhaust fan 522 and the connection part between the second exhaust duct 512 and the first exhaust duct 511. In the present embodiment, additionally, the filter 530 is placed between the pressure detecting section 540 and the second exhaust fan 522. As shown in FIG. 11, in the exhaust path defined by the first exhaust ducts 510 and 511 and the second exhaust duct 512, each of the first exhaust fans 520 and 521 is arranged in series with the second exhaust fan 522.

When the first exhaust fans 520 and 521 are driven, the air near the suction ports 550 and 551 is sucked into the first exhaust ducts 510 and 511 respectively. At that time, the by-products near the suction ports 550 and 551 are also sucked together with the air into the first exhaust ducts 510 and 511. The air in the first exhaust ducts 510 and 511 is caused to flow from the first exhaust ducts 510 and 511 into the second exhaust duct 512 when the first exhaust fans 520 and 521 are driven.

The air flowing from the first exhaust ducts 510 and 511 into the second exhaust duct 512 is caused to pass through the filter 530 when the second exhaust fan 522 is driven, and then the air is exhausted from the image forming apparatus 500 through the exhaust port 552. The air to be discharged through the exhaust port 552 after passing through the filter 530 is harmless air from which the by-products have been removed.

In the image forming apparatus 500 in the present embodiment, the drive voltage of the second exhaust fan 522 is controlled, thereby adjusting the pressure in a position between the first exhaust fans 520 and 521 and the second exhaust fan 522 to continuously fall within an appropriate range. If the pressure at that position is too high, it may adversely affect the devices or units in the image forming apparatus 500 and images to be formed by the image forming apparatus 500. For instance, when appropriate air exhaust from the apparatus could not be performed due to high pressure between the first exhaust fans 520 and 521 and the second exhaust fan 522, the amount of heat going out of the image forming apparatus 500 decreases, thereby making it impossible to appropriately keep the internal temperature of the apparatus 500.

On the other hand, when the pressure between the first exhaust fans 520 and 521 and the second exhaust fan 522 is too low, the suction force at each of the suction ports 550 and 551 may be excessively increased. This may cause toner near the suction ports 550 and 551 to scatter in the apparatus. Further, the internal temperature of the apparatus is excessively decreased, leading to excessive cooling of the fixing unit 60, for example. This may also deteriorate image quality.

Consequently, the controller 590 of the image forming apparatus 500 in the present embodiment controls the drive voltage of the second exhaust fan 522 so that the pressure at the pressure adjusting position between the first exhaust fans 520 and 521 and the second exhaust fan 522, which is detected by the pressure detecting section 540, is always held at a pressure that does not cause the aforementioned problems. In the image forming apparatus 500, the pressure between the first exhaust fans 520 and 521 and the second exhaust fan 522 preferably falls within the range of 0 Pa to −30 Pa inclusive (within the appropriate pressure range) in pressure gauge.

Figure 12:
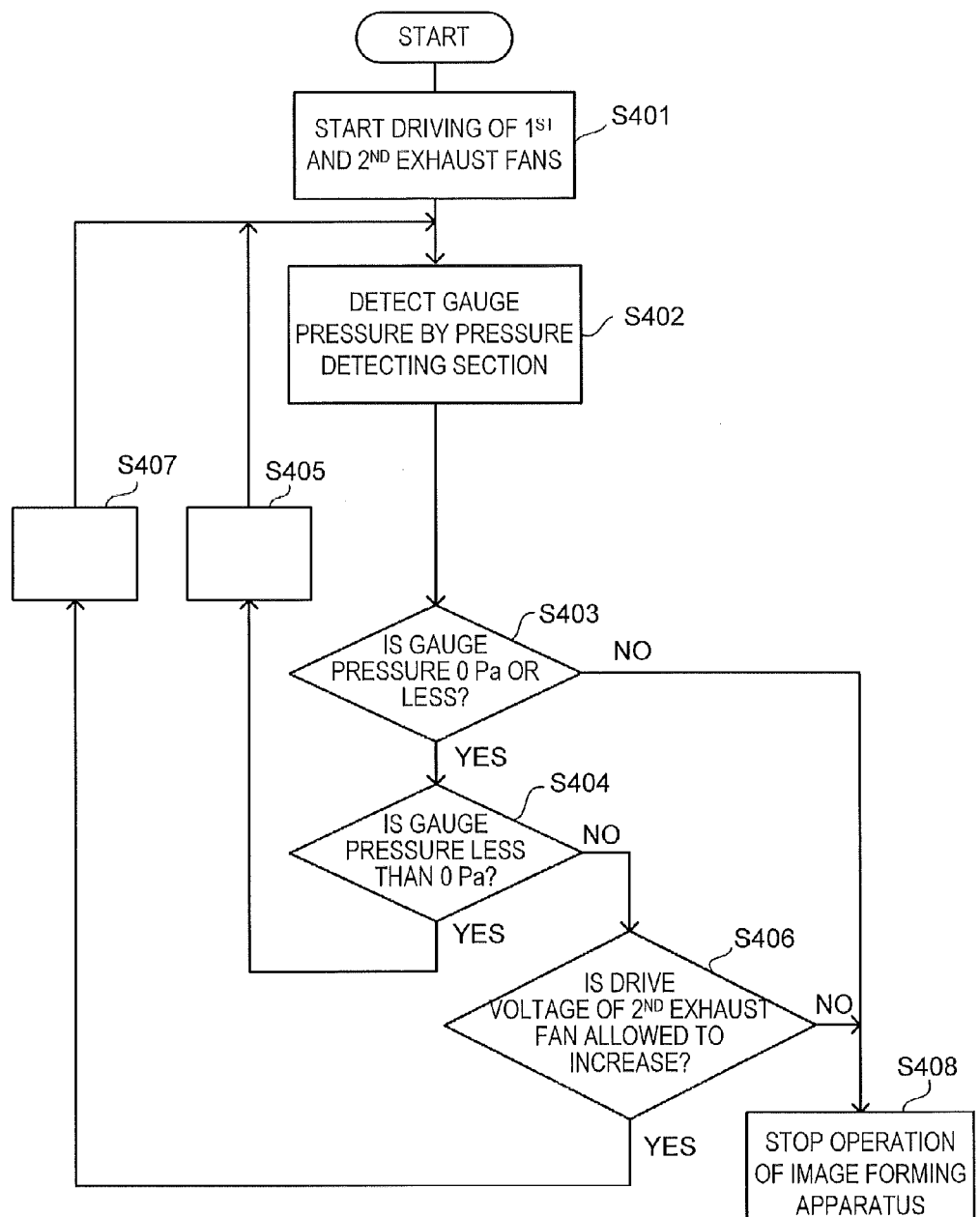
FIG. 12 is a flowchart of operations for performing exhaust of air from the image forming apparatus in the fourth embodiment.

Next, the operations of the image forming apparatus 500 will be explained referring to a flowchart in FIG. 12. The first exhaust fans 520 and 521 and the second exhaust fan 522 are not driven and remain stopped while the image forming apparatus 500 is not performing the image forming operation. When the image forming operation is started, all the first exhaust fans 520 and 521 and the second exhaust fan 522 start to be driven (S401).

Successively, the pressure detecting section 540 detects the gauge pressure and outputs a detected value thereof to the controller 590 (S402). The controller 590 judges whether or not the gauge pressure transmitted from the pressure detecting section 540 is 0 Pa or less (S403). The gauge pressure detected by the pressure detecting section 540 is normally 0 Pa or less because the discharge air-flow rate of the second exhaust fan 522 is larger than the sum of the air flow rates of the first exhaust fans 520 and 521.

When the gauge pressure is 0 Pa or less (S403: YES), it is then judged whether or not this gauge pressure is less than a set pressure value (S404). The set pressure value is a value determined to fall within the range of 0 Pa or less and −30 Pa or more (within the appropriate pressure range) in gauge pressure.

When the gauge pressure is less than the set pressure value (S404: YES), the drive voltage of the second exhaust fan 522 is decreased by a predetermined value (S405). On the other hand, when the gauge pressure is equal to or larger than the set pressure value (S404: NO) and the drive voltage of the second exhaust fan 522 is allowed to increase more than a current state (S406: YES), the drive voltage of the second exhaust fan 522 is increased by a predetermined value (S407). After the drive voltage of the second exhaust fan 522 is controlled (S405, S407), the processing returns to step S402.

Specifically, while the image forming apparatus 500 continues to operate, the drive voltage of the second exhaust fan 522 is decreased or increased based on the gauge pressure detected by the pressure detecting section 540 (S405, S407). Accordingly, the gauge pressure detected by the pressure detecting section 540 is maintained at about the set pressure value, thereby enabling the image forming apparatus 500 to perform appropriate air exhaust. In the image forming apparatus 500, therefore, the pressure in a position between the first exhaust fans 520 and 521 and the second exhaust fan 522 is adjusted to fall within the range of 0 Pa to −30 Pa inclusive (within the appropriate pressure range). When the image forming apparatus 500 terminates the image forming operation, detection of the gauge pressure by the pressure detecting section 540 and driving of the first exhaust fans 520 and 521 and the second exhaust fan 522 are stopped.

On the other hand, even though the image forming apparatus 500 is in image forming operation, when the gauge pressure detected by the pressure detecting section 540 exceeds 0 Pa (S403: NO), the image forming operation of the image forming apparatus 500 is stopped (S408). The reason is because the image forming apparatus 500 could not perform appropriate air exhaust in this case, for example, which may result in excessive increase in the internal temperature of the apparatus, thereby deteriorating the quality of images to be formed and further leading to breakdown of the image forming apparatus 500.

During the image forming operation of the image forming apparatus 500, when the gauge pressure detected by the pressure detecting section 540 is equal to or larger than the set pressure value (S404: NO) and the drive voltage of the second exhaust fan 522 is not allowed to increase more than the current state (S406: NO), the image forming operation of the image forming apparatus 500 is also stopped (S408). This is because, in this case, the drive voltage of the second exhaust fan 522 has reached an upper limit and thus it is difficult to maintain the pressure between the first exhaust fans 520 and 521 and the second exhaust fan 522 at atmospheric pressure or less.

When the image forming apparatus 500 is stopped for the above reasons, if clogging of the filter 530 is considered as a cause of making the processing advance to step S408, it may be arranged to inform a user that the time for replacement of the filter 530 has come. Alternatively, if the cause is conceived to be due to the decrease in discharge air-flow rate of the second exhaust fan 522 by breakdown or service life, it may be arranged to inform a user thereof.

The above explanation shows that the pressure detecting section 540 is placed at a position in the exhaust path in the second exhaust duct 512 on the downstream side of the connection part between the second exhaust duct 512 and the first exhaust duct 511 and on the upstream side of the filter 530 and the second exhaust fan 522. However, it is only necessary to adjust the exhaust air-flow rate of the second exhaust fan 522 in the exhaust path in the second exhaust duct 512 based on the pressure at any position between the connection part between the second exhaust duct 512 and the first exhaust duct 511 and the second exhaust fan 522. Specifically, the pressure detecting section 540 may be placed between the filter 530 and the second exhaust fan 522 in FIG. 11.

As in the exhaust air cleaning apparatus 201 in the first embodiment explained referring to FIG. 3, the positions of the filter 530 and the second exhaust fan 522 may be reversed from those in FIG. 11. When the positions of the filter 530 and the second exhaust fan 522 are reversed from those in FIG. 11, the pressure detecting section 540 can be placed at a position between the connection part between the second exhaust duct 512 and the first exhaust duct 511 and the second exhaust fan 522.

When the positions of the filter 530 and the second exhaust fan 522 are reversed from those in FIG. 11, the pressure detecting section 540 may be placed at a position between the second exhaust fan 522 and the filter 530. In this case, the relationship between the gauge pressure on the upstream side of the second exhaust fan 522 and the gauge pressure on the downstream side of the same is determined in advance by experiments or the like. Based on the gauge pressure on the downstream side of the second exhaust fan 522, which is detected by the pressure detecting section 540, the gauge pressure on the upstream side of the second exhaust fan 522 can be determined.

The above explanation shows the image forming apparatus 500 configured to control the drive voltage of the second exhaust fan 522, thereby enabling appropriately adjusting the pressure between the first exhaust fans 520 and 521 and the second exhaust fan 522. However, the image forming apparatus 500 may be con figured as in the aforementioned second or third embodiment.

Specifically, the opening and closing valve 340 explained in the second embodiment may be provided at a position between the second exhaust fan 522 and the connection part which is the most downstream of the connection parts between the second exhaust duct 512 and the first exhaust ducts 510 and 511 in the exhaust path in the second exhaust duct 512. As an alternative, the opening and closing gate 440 explained in the third embodiment may be provided at a position between the second exhaust fan 522 and the connection part which is the most downstream of the connection parts between the second exhaust duct 512 and the first exhaust ducts 510 and 511 in the exhaust path in the second exhaust duct 512. This is because those configurations can similarly adjust the pressure between the first exhaust fans 520 and 521 and the second exhaust fan 522.

As explained in detail above, the image forming apparatus 500 in the fourth embodiment includes the first exhaust ducts 510 and 511 and the second exhaust duct 512. In the first exhaust ducts 510 and 511, there are respectively provided the first exhaust fans 520 and 521. In the second exhaust duct 512, the filter 530 and the second exhaust fan 522 are provided downstream of both the connection parts with the first exhaust ducts 510 and 511. The image forming apparatus 500 is operated to exhaust air while adjusting the pressure at a position between the most downstream one of the connection parts between the second exhaust duct 512 and the first exhaust ducts 510 and 511 and the second exhaust fan 522 to an appropriate pressure equal to or less than the atmospheric pressure. Accordingly, the image forming apparatus can be achieved capable of appropriately collecting by-products generated during image formation while suppressing adverse influences on the devices or units for image formation and quality deterioration of images to be formed.

The present embodiment is a mere example of the present invention and does not limit the invention. Thus, the present invention may be embodied in other specific forms without departing from the essential characteristics thereof. As an alternative, either one of the first exhaust ducts 510 and 511 may be configured to have no exhaust fan. As another alternative, the first exhaust ducts 510 and 511 may also be provided with filters. As another alternative, the number of the exhaust ducts connected to the second exhaust duct 512 may be one or three or more. For instance, the suction port of the first exhaust duct may be provided in any position in the image forming apparatus from which air should be exhausted, not limited to near the developer and the fixing unit. Furthermore, the present invention is applicable, not only to the aforementioned image forming apparatus 500 configured as the tandem type color printer but also to a 4-cycle type apparatus including different color developers arranged around a single photoconductor. For instance, the present invention is also applicable to a black-and-white copier or printer, a facsimile, or a composed machine including all functions thereof.

The aforementioned exhaust air cleaning apparatus may be arranged to further include an adjusting-position pressure value output section configured to output an adjusting-position pressure value indicative of the pressure at the pressure adjusting position, wherein the pressure adjusting part is configured to perform the pressure adjustment by adjusting a discharge air flow rate of the fan so that the pressure indicated by the adjusting-position pressure value falls within the appropriate pressure range. By adjusting the discharge air-flow rate of the fan, it is accordingly possible to continuously maintain the pressure at the pressure adjusting position within the appropriate pressure range.

The aforementioned exhaust air cleaning apparatus may be arranged such that the pressure adjusting part is configured to perform the pressure adjustment by: decreasing the discharge air flow rate of the fan when the pressure indicated by the adjusting-position pressure value is less than a set pressure value determined in advance within the appropriate pressure range, or increasing the discharge air flow rate of the fan when the pressure indicated by the adjusting-position pressure value exceeds the set pressure value. By adjusting the discharge air-flow rate of the fan to keep a pressure value at the adjusting position ("adjusting-position pressure value"), it is possible to continuously maintain the pressure at the pressure adjusting position within the appropriate pressure range.

The aforementioned exhaust air cleaning apparatus may be arranged to further includes: an adjusting-position pressure value output section configured to output an adjusting-position pressure value indicative of the pressure at the pressure adjusting position; and an opening and closing gate provided in a position between the pressure adjusting position and the fan and configured to adjust an opening area in the cleaning duct at the position, wherein the pressure adjusting part is configured to perform the pressure adjustment by adjusting an opening degree of the opening and closing gate so that the pressure indicated by the adjusting-position pressure value falls within the appropriate pressure range. By adjusting the opening degree of the opening and closing gate, it is possible to continuously maintain the pressure at the pressure adjusting position within the appropriate pressure range.

The aforementioned exhaust air cleaning apparatus may be arranged such that the pressure adjusting part is configured to perform the pressure adjustment by: decreasing the opening degree of the opening and closing gate when the pressure indicated by the adjusting-position pressure value is less than a set pressure value determined in advance within the appropriate pressure range, or increasing the opening degree of the opening and closing gate when the pressure indicated by the adjusting-position pressure value exceeds the set pressure value. By adjusting the opening degree of the opening and closing gate to keep the adjusting-position pressure value at the set pressure value, the pressure at the pressure adjusting position can be continuously maintained within the appropriate pressure range.

The aforementioned exhaust air cleaning apparatus may be arranged such that the pressure adjusting part is an opening and closing valve provided at the pressure adjusting position in the cleaning duct and configured to allow a larger amount of air to flow from outside to inside of the duct as the pressure inside the cleaning duct at the pressure adjusting position is lower than pressure outside the duct. By adjusting the inflow rate of air from outside to inside of the cleaning duct through the opening and closing valve, the pressure at the pressure adjusting position can be continuously maintained within the appropriate pressure range.

In the aforementioned exhaust air cleaning apparatus, preferably, the adjusting-position pressure value output section is configured to output a gauge pressure as the adjusting-position pressure value. This is because pressure adjustment is preferably performed based on the gauge pressure at that position to adjust the pressure at the pressure adjusting position within the appropriate pressure range.

In the aforementioned exhaust air cleaning apparatus, preferably, the appropriate pressure range is determined in a range of 0 Pa or less and −30 Pa or more in gauge pressure. This is because when the pressure at the pressure adjusting position exceeds 0 Pa in gauge pressure, it may interfere with exhaust of air from the image forming apparatus. The further reason is because the air before passing through the filter of the exhaust air cleaning apparatus may leak out through the connection part between the exhaust port of the image forming apparatus and the inflow part of the exhaust air cleaning apparatus and others. When the pressure at the pressure adjusting position is less than −30 Pa in gauge pressure, the image forming apparatus is apt to excessively exhaust air, which may result in excessive cooling of the fixing unit of the image forming apparatus or other defects. Accordingly, the pressure at the pressure adjusting position is adjusted to fall within the range of 0 Pa to −30 Pa inclusive in gauge pressure, thereby allowing the exhaust air discharged from the image forming apparatus to be cleaned or purified without causing the above problems.

The aforementioned exhaust air cleaning apparatus, preferably, further includes an openable part provided in a position upstream of the filter in a direction of air flowing in the cleaning duct and configured to be placed in a closed state providing no communication between inside and outside of the cleaning duct or in an open state allowing communication between the inside and the outside of the cleaning duct, wherein the openable part is placed in the closed state when the pressure at the pressure adjusting position is equal to or less than atmospheric pressure, or the openable part is placed in the open state when the pressure at the pressure adjusting position exceeds the atmospheric pressure. When the pressure at the pressure adjusting position exceeds the atmospheric pressure, it may interfere with exhaust air from the image forming apparatus, which may result in deterioration in image quality and further breakage of the image forming apparatus. Furthermore, the exhaust air from the image forming apparatus is normally the air having been already made harmless in conformity to a fixed standard. While the pressure at the pressure adjusting position is higher than atmospheric pressure, accordingly, it is preferable to directly discharge exhaust air from the image forming apparatus without interference.

In the aforementioned exhaust air cleaning apparatus, preferably, the cleaning duct includes a plurality of inflow parts, and the pressure adjusting part is configured to perform the pressure adjustment when the pressure adjusting position corresponds to a position between the fan and the inflow part located on most downstream of the plurality of inflow parts in an air flowing direction in the cleaning duct. The exhaust air cleaning apparatus attached to the image forming apparatus including a plurality of exhaust ports has a plurality of inflow parts corresponding to the exhaust ports in some cases. In these cases, it is preferable to adjust the pressure at the pressure adjusting position between the inflow part located on the most downstream of the plurality of inflow parts and the fan.

Another aspect of the invention provides An image forming apparatus including a forming section to form an image on a sheet, the image forming apparatus including: a first duct provided with a suction port opening inside the apparatus; a second duct connected with the first duct and provided with an exhaust port opening outside the apparatus; a first fan provided in the first duct and configured to allow air to flow in a direction from the suction port to the second duct; a second fan configured to allow the air to flow in a direction from the first duct to the exhaust port and a filter configured to collect fine particles in the air, the second fan and the filter being provided in the second duct; and a pressure adjusting part con figured to perform pressure adjustment in the first and second ducts, wherein the pressure adjusting part is configured to adjust the pressure so that pressure at a pressure adjusting position located between the first fan in the first duct and the second fan in the second duct falls within an appropriate pressure range determined in advance to be equal to or less than atmospheric pressure.

In the image forming apparatus configured as above, the pressure at the pressure adjusting position between the first fan and the second fan in the first and second ducts is always maintained within the appropriate pressure range determined to be atmospheric pressure or less. This makes it possible to appropriately exhaust air from the image forming apparatus. Specifically, it is possible to clean exhaust air in the image forming apparatus while suppressing the adverse influences on the devices or units for image formation in the image forming apparatus and the quality deterioration of images to be formed.

The above image forming apparatus may be arranged to further include an adjusting-position pressure value output section configured to output an adjusting-position pressure value indicative of pressure at the pressure adjusting position, wherein the pressure adjusting part is configured to perform the pressure adjustment by adjusting a discharge air flow rate of the second fan so that the pressure indicated by the adjusting-position pressure value falls within the appropriate pressure range. By adjusting the discharge air-flow rate of the second fan, it is possible to maintain the pressure at the pressure adjusting position within the appropriate pressure range.

The above image forming apparatus may be arranged such that the pressure adjusting part is configured to perform the pressure adjustment by: decreasing the discharge air flow rate of the second fan when the pressure indicated by the adjusting-position pressure value is less than a set pressure value determined in advance within the appropriate pressure range, or increasing the discharge air flow rate of the second fan when the pressure indicated by the adjusting-position pressure value exceeds the set pressure value. By adjusting the blast volume of the second fan to keep the adjusting-position pressure value at the set pressure value, it is possible to continuously maintain the pressure at the pressure adjusting position within the appropriate pressure range.

The above image forming apparatus may be arranged to further include: an adjusting-position pressure value output section configured to output an adjusting-position pressure value indicative of the pressure at the pressure adjusting position; and an opening and closing gate provided in a position between the pressure adjusting position and the second fan and configured to adjust an opening area in the cleaning duct at the position, wherein the pressure adjusting part is configured to perform the pressure adjustment by adjusting an opening degree of the opening and closing gate so that the pressure indicated by the adjusting-position pressure value falls within the appropriate pressure range. By adjusting the opening degree of the opening and closing gate, it is possible to continuously maintain the pressure at the pressure adjusting position within the appropriate pressure range.

The above image forming apparatus may be arranged such that the pressure adjusting part is configured to perform the pressure adjustment by: decreasing the opening degree of the opening and closing gate when the pressure indicated by the adjusting-position pressure value is less than a set pressure value determined in advance within the appropriate pressure range, or increasing the opening degree of the opening and closing gate when the pressure indicated by the adjusting-position pressure value exceeds the set pressure value. By adjusting the opening degree of the opening and closing gate to keep the adjusting-position pressure value at the set pressure value, the pressure at the pressure adjusting position can be continuously maintained within the appropriate pressure range.

The above image forming apparatus may be arranged such that the pressure adjusting part is an opening and closing valve provided at the pressure adjusting position in one of the first duct and the second duct and configured to allow a larger amount of air to flow from outside to inside of the one of the first and second ducts as pressure inside the one duct at the pressure adjusting position is lower than pressure outside the one duct. By adjusting the inflow rate of air from outside to inside of the duct through the opening and closing valve, the pressure at the pressure adjusting position can be continuously maintained within the appropriate pressure range.

In the aforementioned image forming apparatus, preferably, the adjusting-position pressure value output section is configured to output a gauge pressure as the adjusting-position pressure value. This is because pressure adjustment is preferably performed based on the gauge pressure at that position to adjust the pressure at the pressure adjusting position within the appropriate pressure range.

In the aforementioned image forming apparatus, preferably, the appropriate pressure range is determined in a range of 0 Pa or less and −30 Pa or more in gauge pressure. This is because when the pressure at the pressure adjusting position exceeds 0 Pa in gauge pressure, it may interfere with appropriate exhaust of air from the image forming apparatus. When the pressure at the pressure adjusting position is less than −30 Pa in gauge pressure, the image forming apparatus is apt to excessively exhaust air, which may result in excessive cooling of the fixing unit and other defects. Accordingly, the pressure at the pressure adjusting position is adjusted to fall within the range of 0 Pa to −30 Pa inclusive in gauge pressure, thereby allowing the exhaust air to be cleaned or purified appropriately without causing the above problems.

In the aforementioned image forming apparatus, preferably, the cleaning duct includes a plurality of first inflow parts, and the pressure adjusting part is configured to perform the pressure adjustment when the pressure adjusting position corresponds to a position between the second fan and a most downstream one of connection parts of the first ducts with the second inflow part in an air flowing direction in the second cleaning duct. When the image forming apparatus includes a plurality of first ducts, it is preferable to perform pressure adjustment at the pressure adjusting position between the second fan and the most downstream one of the connection parts of the plurality of first ducts with the second duct.

REFERENCE SIGNS LIST

100, 500 Image forming apparatus
120, 121, 552 Exhaust port
200, 201, 300, 400 Exhaust air cleaning apparatus
210, 310, 410 Cleaning duct
220, 221, 320, 321, 420, 421 Inflow part
230, 330, 430 Air-flow measuring section
240, 441 Pressure detecting section
250, 350, 450 Cleaning filter
260, 360, 460 Exhaust fan
270, 370, 470 Outlet port
340 Opening and closing valve
440 Opening and closing gate
510, 511 First exhaust duct
512 Second exhaust duct
520, 521 First exhaust fan
522 Second exhaust fan
530 Filter
540 Pressure detecting section
550, 551 Suction port

What is claimed is:
1. An exhaust air cleaning apparatus including a cleaning duct for cleaning air to be exhausted from an image forming apparatus through an exhaust port of the image forming apparatus, the exhaust air cleaning apparatus including:
   an inflow part communicated with an inside of the cleaning duct and connected with the exhaust port of the image forming apparatus;
   a discharge port through which air in the cleaning duct is to be discharged out of the cleaning duct;
   a fan for allowing air to flow from the inflow part toward the discharge port and a filter for collecting fine particles in the air, the fan and the filter being provided between the inflow part and the discharge port in the cleaning duct;
   a pressure adjusting part configured to perform adjustment of pressure in the cleaning duct,
   the pressure adjusting part being configured to adjust the pressure in the cleaning duct so that pressure at a pressure adjusting position located between the inflow part and the fan in the cleaning duct falls within an appropriate pressure range determined in advance to be equal to or less than atmosphere pressure; and
   an adjusting-position pressure value output section configured to output an adjusting-position pressure value indicative of the pressure at the pressure adjusting portion,
   wherein the pressure adjusting part is configured to perform the pressure adjustment by:
      adjusting a discharge air flow rate of the fan so that the pressure indicated by the adjusting-position pressure value falls within the appropriate pressure range, and
      decreasing the discharge air flow rate of the fan when the pressure indicated by the adjusting-position pressure value is less than a set pressure value determined in advance within the appropriate pressure range, or increasing the discharge air flow rate of the fan when the pressure indicated by the adjusting-position pressure value exceeds the set pressure value.

2. The exhaust air cleaning apparatus according to claim 1, wherein the adjusting-position pressure value output section is configured to output a gauge pressure as the adjusting-position pressure value.

3. The exhaust air cleaning apparatus according to claim 1, wherein the appropriate pressure range is determined in a range of 0 Pa or less and −30 Pa or more in gauge pressure.

4. The exhaust air cleaning apparatus according to claim 1, wherein
the cleaning duct includes a plurality of inflow parts, and
the pressure adjusting part is configured to perform the pressure adjustment when the pressure adjusting position corresponds to a position between the fan and the inflow part located most downstream of the plurality of inflow parts in an air flowing direction in the cleaning duct.

5. An exhaust air cleaning apparatus including a cleaning duct for cleaning air to be exhausted from an image forming apparatus through an exhaust port of the image forming apparatus, the exhaust air cleaning apparatus including:
an inflow part communicated with an inside of the cleaning duct and connected with the exhaust port of the image forming apparatus;
a discharge port through which air in the cleaning duct is to be discharged out of the cleaning duct;
a fan for allowing air to flow from the inflow part toward the discharge port and a filter for collecting fine particles in the air, the fan and the filter being provided between the inflow part and the discharge port in the cleaning duct;
a pressure adjusting part configured to perform adjustment of pressure in the cleaning duct,
the pressure adjusting part being configured to adjust the pressure in the cleaning duct so that pressure at a pressure adjusting position located between the inflow part and the fan in the cleaning duct falls within an appropriate pressure range determined in advance to be equal to or less than atmospheric pressure; and
an adjusting-position pressure value output section configured to output an adjusting-position pressure value indicative of the pressure at the pressure adjusting position;
an opening and closing gate provided in a position between the pressure adjusting position and the fan and configured to adjust an opening area in the cleaning duct at the position, and
wherein the pressure adjusting part is configured to perform the pressure adjustment by adjusting an opening degree of the opening and closing gate by predetermined amounts so that the pressure indicated by the adjusting-position pressure value falls within the appropriate pressure range.

6. The exhaust air cleaning apparatus according to claim 5, wherein the adjusting-position pressure value output section is configured to output a gauge pressure as the adjusting-position pressure value.

7. An exhaust air cleaning apparatus including a cleaning duct for cleaning air to be exhausted from an image forming apparatus through an exhaust port of the image forming apparatus, the exhaust air cleaning apparatus including:
an inflow part communicated with an inside of the cleaning duct and connected with the exhaust port of the image forming apparatus;
a discharge port through which air in the cleaning duct is to be discharged out of the cleaning duct;
a fan for allowing air to flow from the inflow part toward the discharge port and a filter for collecting fine particles in the air, the fan and the filter being provided between the inflow part and the discharge port in the cleaning duct;
a pressure adjusting part configured to perform adjustment of pressure in the cleaning duct,
the pressure adjusting part being configured to adjust the pressure in the cleaning duct so that pressure at a pressure adjusting position located between the inflow part and the fan in the cleaning duct falls within an appropriate pressure range determined in advance to be equal to or less than atmospheric pressure;
an adjusting-position pressure value output section configured to output an adjusting-position pressure value indicative of the pressure at the pressure adjusting position; and
an opening and closing gate provided in a position between the pressure adjusting position and the fan and configured to adjust an opening area in the cleaning duct at the position,
wherein the pressure adjusting part is configured to perform the pressure adjustment by:
adjusting an opening degree of the opening and closing gate so that the pressure indicated by the adjusting-position pressure value falls within the appropriate pressure range, and
decreasing the opening degree of the opening and closing gate when the pressure indicated by the adjusting-position pressure value is less than a set pressure value determined in advance within the appropriate pressure range, or
increasing the opening degree of the opening and closing gate when the pressure indicated by the adjusting-position pressure value exceeds the set pressure value.

8. An exhaust air cleaning apparatus including a cleaning duct for cleaning air to be exhausted from an image forming apparatus through an exhaust port of the image forming apparatus, the exhaust air cleaning apparatus including:
an inflow part communicated with an inside of the cleaning duct and connected with the exhaust port of the image forming apparatus;
a discharge port through which air in the cleaning duct is to be discharged out of the cleaning duct;
a fan for allowing air to flow from the inflow part toward the discharge port and a filter for collecting fine particles in the air, the fan and the filter being provided between the inflow part and the discharge port in the cleaning duct;
a pressure adjusting part configured to perform adjustment of pressure in the cleaning duct,
the pressure adjusting part being configured to adjust the pressure in the cleaning duct so that pressure at a pressure adjusting position located between the inflow part and the fan in the cleaning duct falls within an appropriate pressure range determined in advance to be equal to or less than atmospheric pressure; and
an openable part provided in a position upstream of the filter in a direction of air flowing in the cleaning duct and configured to be placed in a closed state providing no communication between inside and outside of the cleaning duct or in an open state allowing communication between the inside and the outside of the cleaning duct, and wherein the openable part is placed in the closed state when the pressure at the pressure adjusting position is equal to or less than atmospheric pressure, or the openable part is placed in the open state when the pressure at the pressure adjusting position exceeds the atmospheric pressure.

9. An image forming apparatus including a forming section to form an image on a sheet, the image forming apparatus including:

a first duct provided with a suction port opening inside the apparatus;

a second duct connected with the first duct and provided with an exhaust port opening outside the apparatus;

a first fan provided in the first duct and configured to allow air to flow in a direction from the suction port to the second duct;

a second fan configured to allow the air to flow in a direction from the first duct to the exhaust port and a filter configured to collect fine particles in the air, the second fan and the filter being provided in the second duct; and a pressure adjusting part configured to perform pressure adjustment in the first and second ducts, wherein the pressure adjusting part is configured to adjust the pressure so that pressure at a pressure adjusting position located between the first fan in the first duct and the second fan in the second duct falls within an appropriate pressure range determined in advance to be equal to or less than atmospheric pressure.

10. The image forming apparatus according to claim 9, further including an adjusting-position pressure value output section configured to output an adjusting-position pressure value indicative of pressure at the pressure adjusting position, wherein the pressure adjusting part is configured to perform the pressure adjustment by adjusting a discharge air flow rate of the second fan so that the pressure indicated by the adjusting-position pressure value falls within the appropriate pressure range.

11. The image forming apparatus according to claim 10, wherein the pressure adjusting part is configured to perform the pressure adjustment by:

decreasing the discharge air flow rate of the second fan when the pressure indicated by the adjusting-position pressure value is less than a set pressure value determined in advance within the appropriate pressure range, or increasing the discharge air flow rate of the second fan when the pressure indicated by the adjusting-position pressure value exceeds the set pressure value.

12. The image forming apparatus according to claim 9, further including:

an adjusting-position pressure value output section configured to output an adjusting-position pressure value indicative of the pressure at the pressure adjusting position; and an opening and closing gate provided in a position between the pressure adjusting position and the second fan and configured to adjust an opening area in the cleaning duct at the position, wherein the pressure adjusting part is configured to perform the pressure adjustment by adjusting an opening degree of the opening and closing gate so that the pressure indicated by the adjusting-position pressure value falls within the appropriate pressure range.

13. The image forming apparatus according to claim 12, wherein the pressure adjusting part is configured to perform the pressure adjustment by:

decreasing the opening degree of the opening and closing gate when the pressure indicated by the adjusting-position pressure value is less than a set pressure value determined in advance within the appropriate pressure range, or increasing the opening degree of the opening and closing gate when the pressure indicated by the adjusting-position pressure value exceeds the set pressure value.

14. The image forming apparatus according to claim 9, wherein the pressure adjusting part is an opening and closing valve provided at the pressure adjusting position in one of the first duct and the second duct and configured to allow a larger amount of air to flow from outside to inside of the one of the first and second ducts as pressure inside the one duct at the pressure adjusting position is lower than pressure outside the one duct.

15. The image forming apparatus according to claim 10, wherein the adjusting-position pressure value output section is configured to output a gauge pressure as the adjusting-position pressure value.

16. The image forming apparatus according to claim 12, wherein the adjusting-position pressure value output section is configured to output a gauge pressure as the adjusting-position pressure value.

17. The image forming apparatus according to claim 9, wherein the appropriate pressure range is determined in a range of 0 Pa or less and −30 Pa or more in gauge pressure.

18. The image forming apparatus according to claim 9, wherein the cleaning duct includes a plurality of first inflow parts, and the pressure adjusting part is configured to perform the pressure adjustment when the pressure adjusting position corresponds to a position between the second fan and a most downstream one of connection parts of the first ducts with the second inflow part in an air flowing direction in the second cleaning duct.

19. The exhaust air cleaning apparatus according to claim 7, wherein the appropriate pressure range is determined in a range of 0 Pa or less and −30 Pa or more in gauge pressure.

20. The exhaust air cleaning apparatus according to claim 7, wherein the cleaning duct includes a plurality of inflow parts, and the pressure adjusting part is configured to perform the pressure adjustment when the pressure adjusting position corresponds to a position between the fan and the inflow part located most downstream of the plurality of inflow parts in an air flowing direction in the cleaning duct.

* * * * *